United States Patent
Nakaishi

(10) Patent No.: US 10,743,009 B2
(45) Date of Patent: Aug. 11, 2020

(54) IMAGE PROCESSING APPARATUS AND IMAGE PROCESSING METHOD

(71) Applicant: SOCIONEXT INC., Yokohama-shi, Kanagawa (JP)

(72) Inventor: Hidenori Nakaishi, Kashiba (JP)

(73) Assignee: SOCIONEXT INC., Yokohama (JP)

(*) Notice: Subject to any disclaimer, the term of this patent is extended or adjusted under 35 U.S.C. 154(b) by 711 days.

(21) Appl. No.: 15/081,554

(22) Filed: Mar. 25, 2016

(65) Prior Publication Data
US 2016/0345008 A1    Nov. 24, 2016

(30) Foreign Application Priority Data

May 20, 2015   (JP) .................................. 2015-102785

(51) Int. Cl.
*H04N 19/436*   (2014.01)
*H04N 19/119*   (2014.01)

(52) U.S. Cl.
CPC ......... *H04N 19/436* (2014.11); *H04N 19/119* (2014.11)

(58) Field of Classification Search
CPC ........................... H04N 19/436; H04N 19/119
See application file for complete search history.

(56) References Cited

U.S. PATENT DOCUMENTS

| | | | | |
|---|---|---|---|---|
| 8,738,860 B1* | 5/2014 | Griffin | ................ | G06F 12/0897 711/122 |
| 2009/0102686 A1* | 4/2009 | Fukuhara | ............. | H04N 19/647 341/67 |
| 2015/0139334 A1* | 5/2015 | Eregala | .................. | H04N 19/96 375/240.24 |
| 2015/0181218 A1 | 6/2015 | Okawa | | |
| 2016/0337667 A1* | 11/2016 | Nagaoka | ................ | H04N 19/91 |

FOREIGN PATENT DOCUMENTS

| | | |
|---|---|---|
| JP | 02-242485 A | 9/1990 |
| JP | 08-044678 A | 2/1996 |
| JP | 2003-051019 A | 2/2003 |
| JP | 2008-079170 A | 4/2008 |
| JP | 2011-167857 A | 9/2011 |
| JP | 2014-011638 A | 1/2014 |

OTHER PUBLICATIONS

Japanese Office Action of related Japanese Patent Application No. 2015-102785, dated Mar. 12, 2019.
Toichi, M., et al., "A VLIW Single-Chip Multi-Processor for Multimedia processing," 2006-ARC-168 (16), pp. 83-88, Jun. 9, 2006.

* cited by examiner

*Primary Examiner* — Nasim N Nirjhar
(74) *Attorney, Agent, or Firm* — Arent Fox LLP

(57) ABSTRACT

An image processing apparatus includes a plurality of cores and an arithmetic processing device. The plurality of cores are configured to be allocated to a plurality of tiles obtained by dividing a single image data; a configured to control allocation of the plurality of cores based on the divided tiles. The arithmetic processing device is configured to control allocation of the plurality of cores based on the divided tiles. The arithmetic processing device allocates all of the plurality of cores to a single line of the plurality of tiles in a second direction, when the single image data is divided into the plurality of tiles in a first direction and the second direction different from the first direction.

22 Claims, 31 Drawing Sheets

FIG. 8
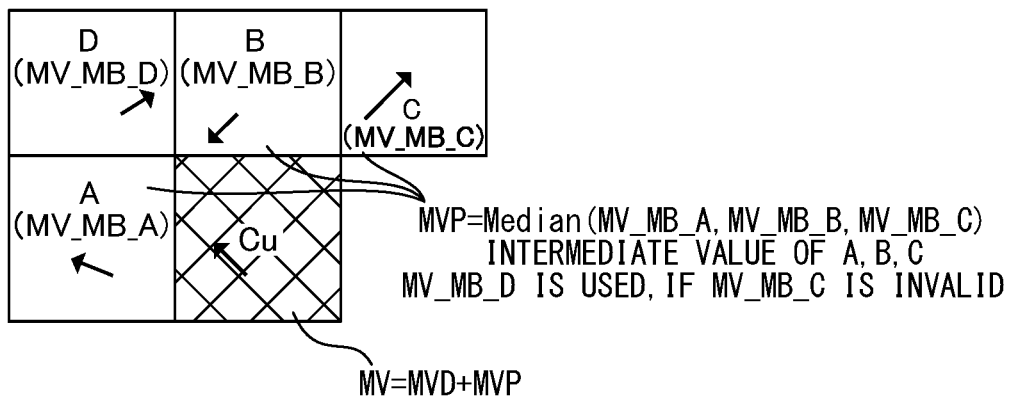
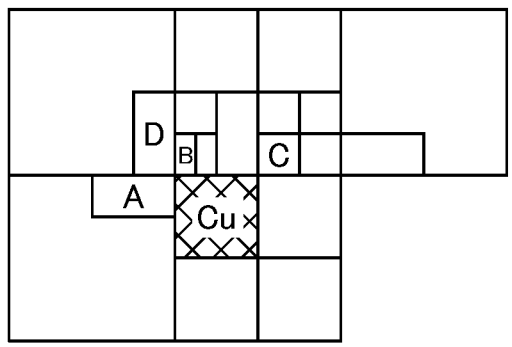
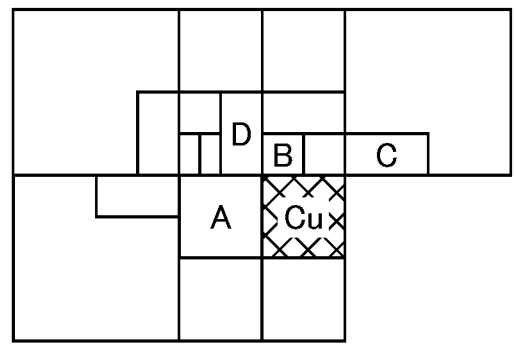
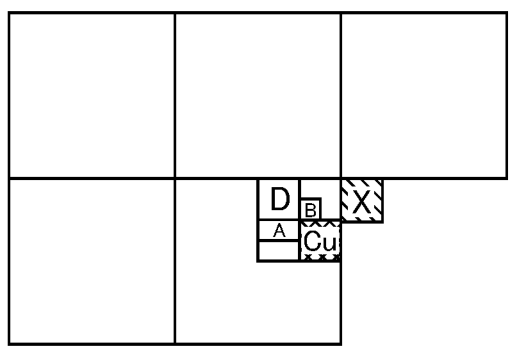

FIG. 20
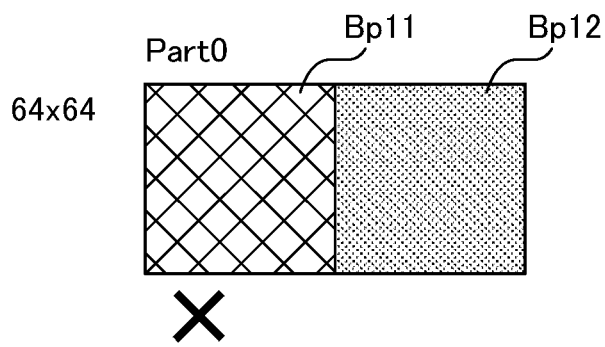
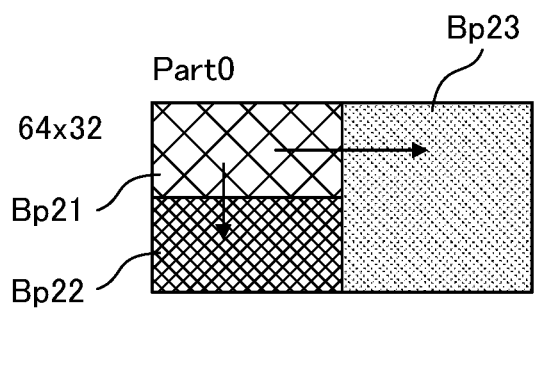
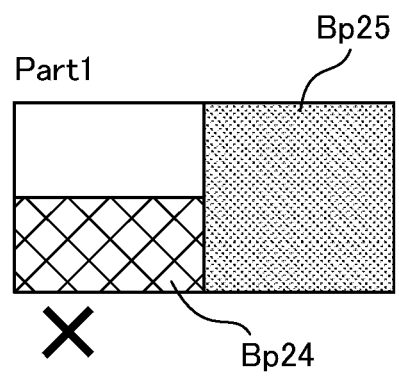
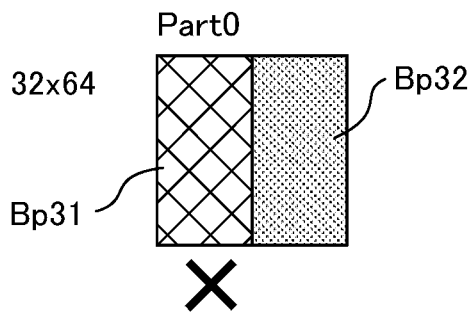
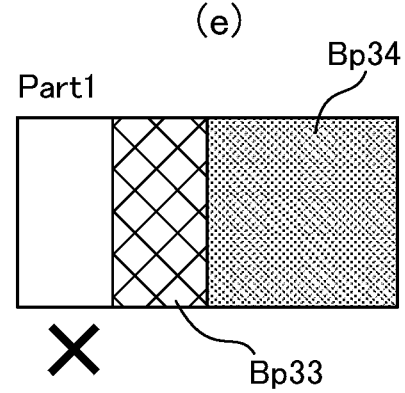

IMAGE PROCESSING APPARATUS AND IMAGE PROCESSING METHOD

CROSS-REFERENCE TO RELATED APPLICATION

This application is based upon and claims the benefit of priority of the prior Japanese Patent Application No. 2015-102785, filed on May 20, 2015, the entire contents of which are incorporated herein by reference.

FIELD

The embodiments described herein are related to an image processing apparatus and an image processing method.

BACKGROUND

In recent years, various video compression techniques have been developed and put into practice. In many video compression techniques (for example, MPEG (Moving Picture Experts Group)-2, H.264, H.265 (HEVC: High Efficiency Video Coding), and the like), techniques of in-screen prediction (intra-prediction) and inter-screen prediction (inter-prediction) are used when encoding/decoding processing is performed.

Incidentally, with the inter-prediction, images in multiple frames (screens) are processed, which increases the processing time. Furthermore, the screen size tends to increase from full high vision (Full HD (1920×1080) to 4K (e.g., 3840×2160) and 8K (e.g., 7680×4320), and accordingly, the processing time also increases to four times (4K) and 16 times (8K).

Therefore, in recent years, it has been common to encode and decode videos by using multiple processor cores (cores). However, when multiple cores are used, waiting times of cores may occur, for example, in the processing order of decoding.

As described above, various suggestions have been made as image processing techniques efficiently performing image processing by using multiple cores, but in accordance with the increase in the screen size, waiting times of cores may occur, for example, in the processing order of decoding.

Such waiting times of cores may bring about a delay in overall image processing. Therefore, it is preferable to reduce the waiting times of cores. However, in image processing apparatuses having multiple cores, the reduction of the waiting times of cores is not sufficient under the current circumstances.

Incidentally, in the past, various kinds of image processing apparatuses and image processing methods efficiently performing image processing by using multiple cores have been suggested.

Patent Document 1: Japanese Laid-open Patent Publication No. H02(1980)-242485
Patent Document 2: Japanese Laid-open Patent Publication No. H08(1996)-044678
Patent Document 3: Japanese Laid-open Patent Publication No. 2003-051019
Patent Document 4: Japanese Laid-open Patent Publication No. 2011-167857

SUMMARY

According to an aspect of the embodiments, there is provided an image processing apparatus includes a plurality of cores and an arithmetic processing device. The plurality of cores are configured to be allocated to a plurality of tiles obtained by dividing a single image data; a configured to control allocation of the plurality of cores based on the divided tiles.

The arithmetic processing device is configured to control allocation of the plurality of cores based on the divided tiles. The arithmetic processing device allocates all of the plurality of cores to a single line of the plurality of tiles in a second direction, when the single image data is divided into the plurality of tiles in a first direction and the second direction different from the first direction.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a drawing for explaining an example of motion vector decoding processing (part 1);

FIG. 20 is a drawing for explaining processing according to the flowchart illustrated in FIG. 19;

FIG. 25A, FIG. 25B and FIG. 25C are drawings for explaining parallel processing with four cores;

DESCRIPTION OF EMBODIMENTS

First, before explaining an image processing apparatus and an image processing method of the present embodiment in details, an example of an image processing technique, an image processing technique as a related technique, and problems associated therewith will be explained with reference to FIG. 1 to FIG. 15.

Figure 1:
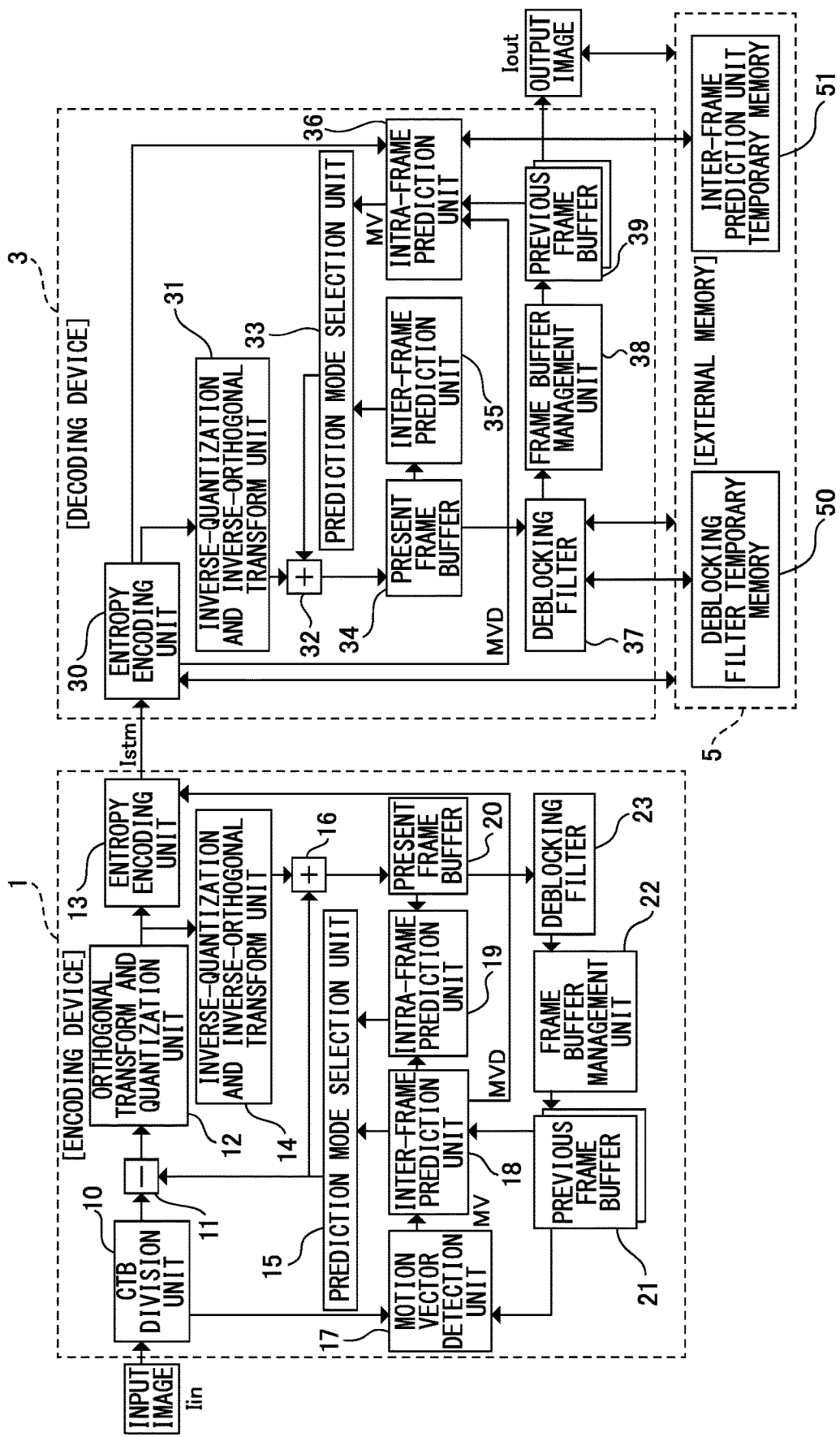
FIG. 1 is a drawing for explaining encoding processing and decoding processing of videos.

FIG. 1 is a drawing for explaining encoding processing and decoding processing of video s, and illustrates an encoding device 1, a decoding device 3, and an external memory 5. As illustrated in FIG. 1, the encoding device 1 receives and encodes an input image Iin which is to be encoded, such as, e.g., a 4K image, and generates an image stream Istm such as, e.g., an HEVC (High Efficiency Video Coding) stream.

The encoding device 1 includes a CTB (Coding Tree Block) division unit 10, a subtracter 11, an orthogonal transform and quantization unit 12, an entropy encoding unit 13, an inverse-quantization and inverse-orthogonal transform unit 14, a prediction mode selection unit 15, an adder 16, and a motion vector detection unit 17.

Further, the encoding device 1 includes an inter-frame prediction unit 18, an intra-frame prediction unit 19, a present frame buffer 20, a previous frame buffer 21, a frame buffer management unit 22, and a deblocking filter 23.

The CTB division unit 10 receives the input image Iin, and performs the CTB division processing thereon, and the subtracter 11 calculates a differential value between an image obtained from the CTB division processing performed with the CTB division unit 10 and the prediction image which has been output from the prediction mode selection unit 15, and outputs the differential value to the orthogonal transform and quantization unit 12.

The orthogonal transform and quantization unit 12 performs orthogonal transformation of the pixel differential value given by the subtracter 11, and thereafter performs quantization. The orthogonal transform and quantization unit 12 outputs the quantized data to the entropy encoding unit 13 and the inverse-quantization and inverse-orthogonal transform unit 14.

The entropy encoding unit 13 transforms the data, which are quantized by the orthogonal transform and quantization unit 12, through variable length coding, and outputs an encoded signal (image stream Istm). The entropy encoding unit 13 outputs the encoded signal (Istm) including the prediction differential value (MVD: Motion Vector Difference) given by the inter-frame prediction unit 18.

Further, the entropy encoding unit 13 calculates a motion vector (MV: Motion Vector) from the prediction differential value (MVD), for example, with a decoding apparatus (not illustrated), and generates a decoded output image.

The inverse-quantization and inverse-orthogonal transform unit 14 inversely quantizes the data quantized by the orthogonal transform and quantization unit 12, and thereafter, performs inverse-orthogonal transform and outputs the processed data to the adder 16. The prediction mode selection unit 15 selects one of prediction images generated by the inter-frame prediction unit 18 and the intra-frame prediction unit 19, whichever the prediction precision is higher, and outputs the prediction image to the subtracter 11 and the adder 16 explained above.

The adder 16 adds an inversely-quantized and inversely-orthogonally transformed pixel that is output from the inverse-quantization and inverse-orthogonal transform unit 14 and a pixel that is output from the prediction mode selection unit 15. The motion vector detection unit 17 uses a CTB received from the CTB division unit 10 and a reference image stored in the previous frame buffer 21 to detect the motion vector (MV) of the target CTB.

The inter-frame prediction unit 18 calculates a motion vector prediction value (MVP: Motion Vector Predictor) based on motion vectors (MVs) in the surrounding area. Further, the inter-frame prediction unit 18 calculates a prediction differential value (MVD) between the motion vector (MV) of the target macro block and the motion vector prediction value (MVP).

The intra-frame prediction unit 19 receives the reference image held in the present frame buffer 20, and performs intra-frame prediction of the reference image based on the pixel levels given from the adjacent blocks. The present frame buffer 20 stores the value given by the adder 16, and the previous frame buffer 21 stores the value given by the frame buffer management unit 22.

The frame buffer management unit 22 receives the output data of the deblocking filter 23, and outputs the output data to the previous frame buffer 21, and the previous frame buffer 21 stores the output data.

The deblocking filter 23 receives the reference image held in the present frame buffer 20, and smoothes and outputs the border between two adjacent macro blocks. For example, an HEVC stream (image stream Istm: encoded signal) which is the output of the encoding device 1 is sent to the decoding device 3 via, for example, a communication circuit such as the Internet, satellite circuit, and the like.

As illustrated in FIG. 1, the decoding device 3 receives and decodes the image stream Istm such as, e.g., an HEVC stream, and generates and outputs a decoded output image Iout such as a 4K image and the like.

The decoding device 3 includes an entropy decoding unit 30, an inverse-quantization and inverse-orthogonal transform unit 31, an adder 32, a prediction mode selection unit 33, a present frame buffer 34, an intra-frame prediction unit 35, and an inter-frame prediction unit 36. Further, the decoding device 3 includes a deblocking filter 37, a frame buffer management unit 38, and a previous frame buffer 39.

As illustrated in FIG. 1, the external memory 5 is an external memory used by the decoding device 3. The external memory 5 includes a deblocking filter temporary memory (Temporary Memory) 50 and an inter-frame prediction unit temporary memory 51.

The CTB division unit 10 receives the input image Iin, and performs the CTB division processing thereon, and the subtracter 11 calculates a differential value between an image obtained from the CTB division processing performed with the CTB division unit 10 and the prediction image which has been output from the prediction mode selection unit 15, and outputs the differential value to the orthogonal transform and quantization unit 12.

The entropy decoding unit 30 receives the image stream Istm (encoded signal), and performs entropy decoding processing thereon, and the inverse-quantization and inverse-orthogonal transform unit 31 performs inverse-quantization and inverse-orthogonal transform on the input information given by the entropy decoding unit 30.

The adder 32 adds an inversely quantized and inversely orthogonally transformed pixel that is output from the inverse-quantization and inverse-orthogonal transform unit 31 and a pixel that is output from the prediction mode selection unit 33. The prediction mode selection unit 33 selects one of pixels decoded by the inter-frame prediction unit 36 and the intra-frame prediction unit 35, and outputs the pixel to the adder 32 explained above.

The present frame buffer 34 stores the pixel of the output result given by the adder 32. The intra-frame prediction unit 35 receives the reference image held in the present frame buffer 34, and performs intra-frame prediction of the reference image based on the pixel levels given from the adjacent blocks.

The inter-frame prediction unit 36 calculates a motion vector prediction value (MVP) based on motion vectors (MVs) in the surrounding area. Further, the inter-frame prediction unit 36 calculates a motion vector (MV) from the addition result of the prediction differential value (MVD) of the target block and the motion vector prediction value (MVP).

The deblocking filter 37 receives the reference image held in the present frame buffer 34, and smoothes and outputs the border between two adjacent blocks. The frame buffer management unit 38 receives the output data of the deblocking filter 37, and outputs the output data of the deblocking filter 37 to the previous frame buffer 39. The previous frame buffer 39 stores the output data. The previous frame buffer 39 stores the value given from the frame buffer management unit 38.

The deblocking filter temporary memory 50 indicates the adjacent memory of the deblocking filter 37, and stores the content processed by the present CTB, and when the present CTB changes to processing for one CTB line below, the stored content is read out. It will be noted that the content processed by the present CTB may be stored to the external memory 5.

The inter-frame prediction unit temporary memory 51 indicates the adjacent memory of the inter-frame prediction unit 36, and stores the content processed by the present CTB, and when the present CTB changes to processing for one CTB line below, the stored content is read out. It will be noted that the content processed by the present CTB may be stored to the external memory 5.

The output image Iout decoded by the decoding device 3 may be output as it is. Alternatively, the output image Iout may be stored to the external memory 5.

Figure 2:
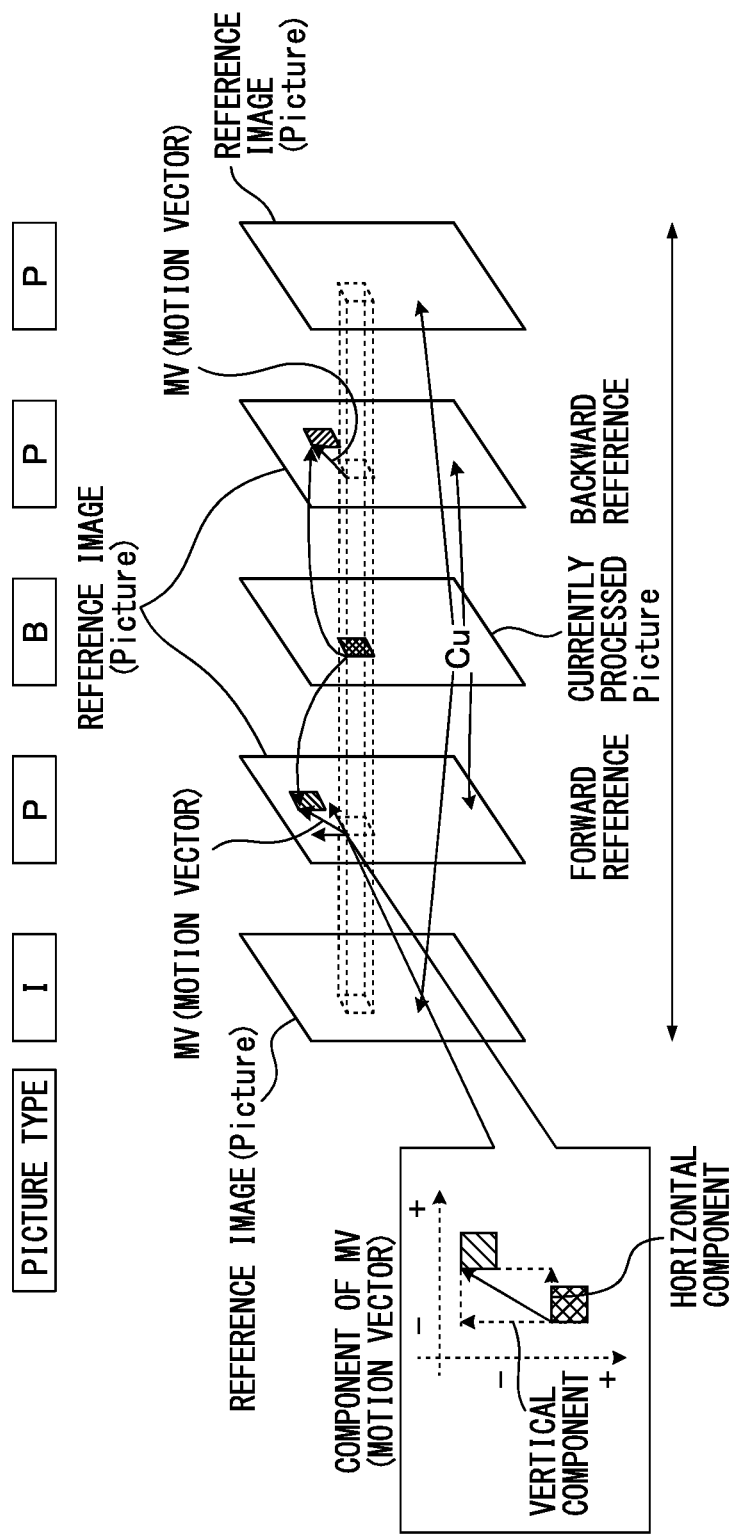
FIG. 2 is a drawing for explaining a unit of encoding processing and decoding processing (part 1)

FIG. 2 to FIG. 5 are drawings for explaining a unit of encoding processing and decoding processing. In the picture types of FIG. 2, reference symbol I represents I picture (Intra-coded Picture), P represents P picture (Predicted Picture), and B represents B picture (Bi-directional Predicted Picture). In FIG. 2, reference symbol Cu represents the present processing block.

The intra-prediction uses I picture that does not need motion vector search processing, and the inter-prediction uses P picture (forward reference) with which motion vector search processing is performed and B picture (forward, backward reference, bidirectional reference) with which motion vector search processing is performed.

More specifically, as illustrated in FIG. 2, when the currently processed image (the present processing picture (Picture)) is B picture, the reference images (Pictures) are used as follows: for example, I, P pictures are used as the forward reference, and the P, P pictures are used as the backward reference. As the components of a MV (motion vector), the MV is derived from the vertical component and the horizontal component.

Figure 3:
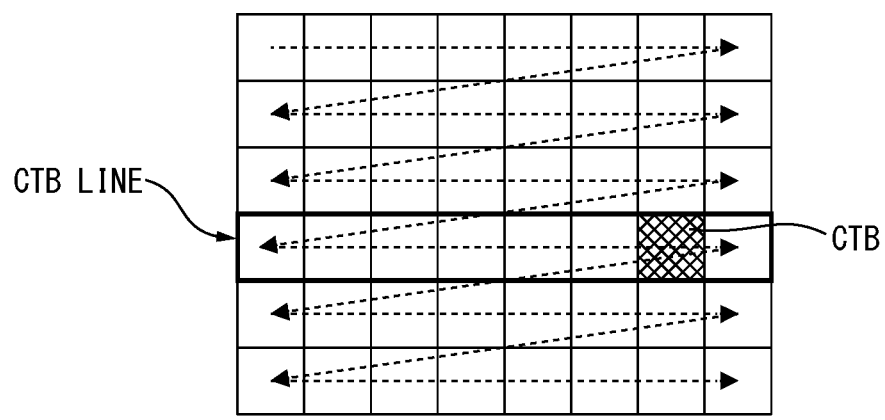
FIG. 3 is a drawing for explaining a unit of encoding processing and decoding processing (part 2)

FIG. 3 illustrates processing of the present processing picture in FIG. 2. In FIG. 3, processing is performed, for example, in the direction of the arrow in units of CTBs (64×64 pixels), and more specifically, processing is performed in order from the upper left corner to the lower right corner for each line in units of CTBs.

Figure 4:
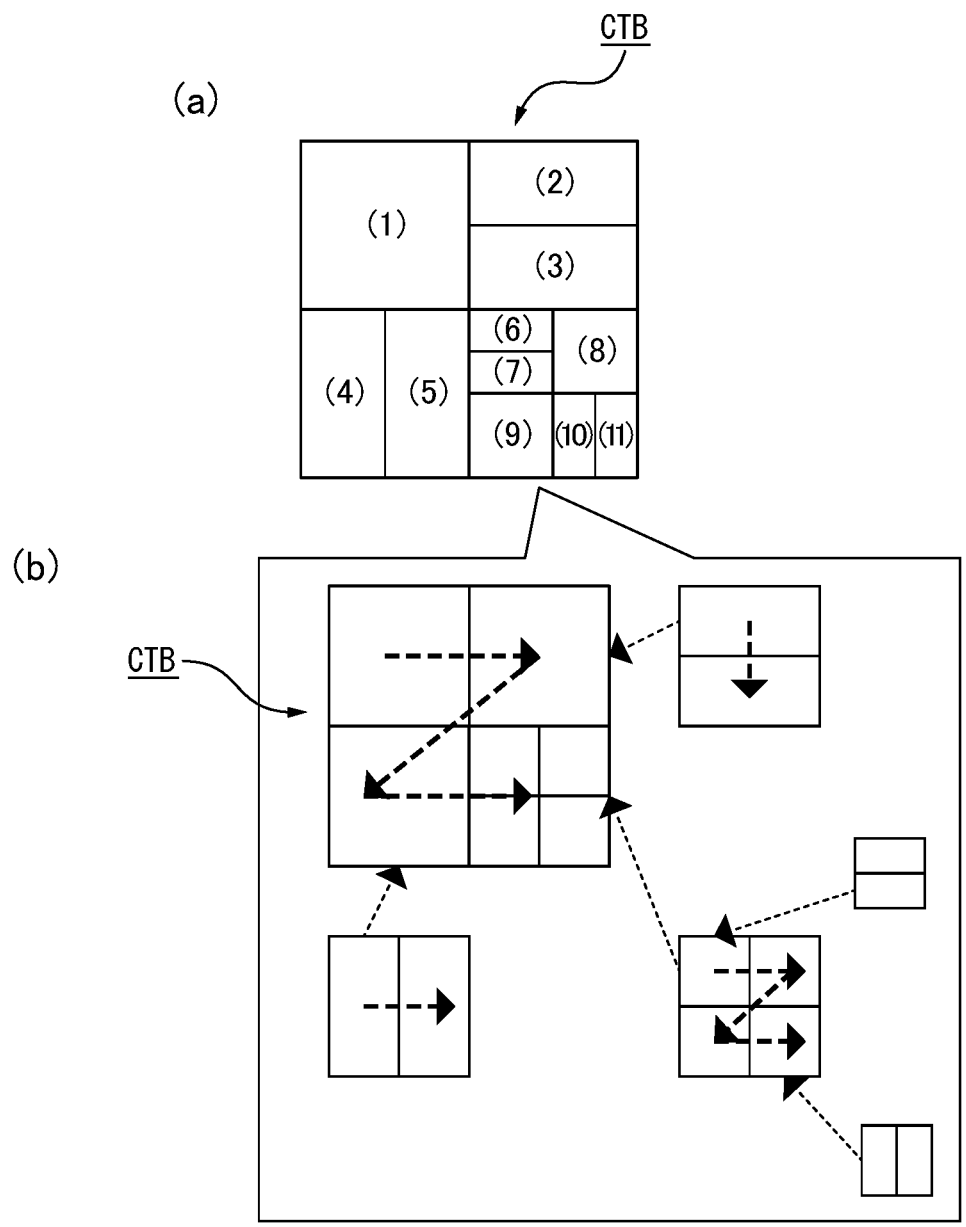
FIG. 4 is a drawing for explaining a unit of encoding processing and decoding processing (part 3)

FIG. 4 illustrates a CTB, and when a division is made within a CTB, FIGS. 4(a) and 4(b) illustrate a case where, for example, a shaped field division (quadtree division) is made, and further, a division is made within the inside thereof. Numerals in parentheses (1), (2), (3), . . . , (11) in the CTB as illustrated in FIG. 4(a) are provided to illustrate an example of sequence of processing in a case where such division is made.

FIG. 4(b) illustrates the sequence of processing in each block. In FIG. 4(b), for example, when the shaped field division is made, the processing is performed in the order of stroke of a letter "Z", and when the division is made into the upper and lower sides, the processing is performed in order from the upper side to the lower side, and when the division is made into the right and left sides, the processing is performed in order from the left to the right sides. More specifically, the processing is performed in order from (1) to (2), (3) , . . . , and (11) in FIG. 4(a).

Figure 5:
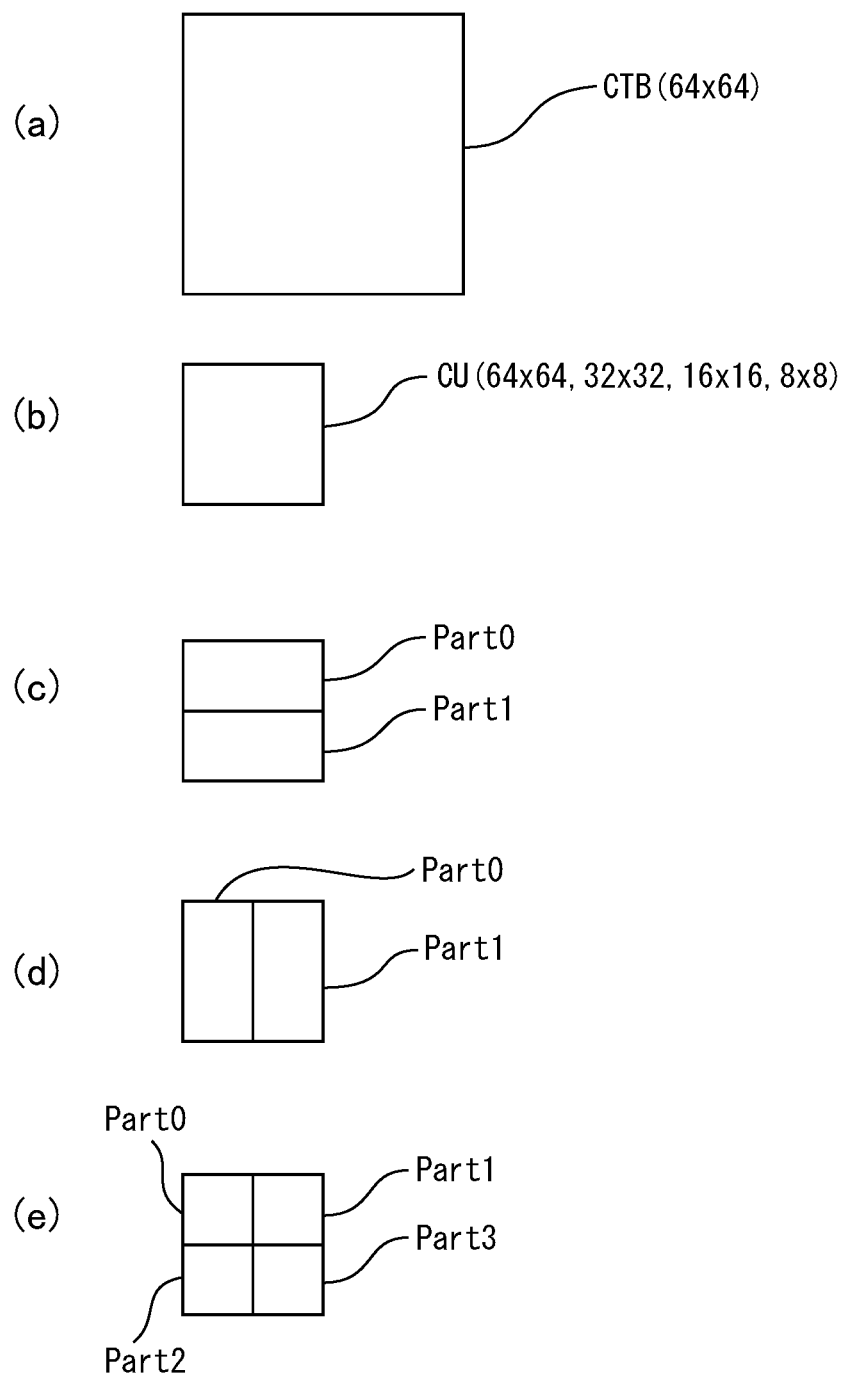
FIG. 5 is a drawing for explaining a unit of encoding processing and decoding processing (part 4)

FIG. 5 illustrates each block unit, and for example, FIG. 5(a) illustrates a CTB (Coding Tree Block) of the largest external frame (64×64 (pixels)), and FIG. 5(b) illustrates CUs (Coding Units) of square units (64×64, 32×32, 16×16, 8×8) divided into a shaped field (quadtree).

Further, FIG. 5(c) to FIG. 5(e) illustrate PUs (Prediction Units) which are parts (Parts: Part 0, Part 1, Part 0 to Part 3) obtained by further dividing the smallest CU, for example.

Figure 6:
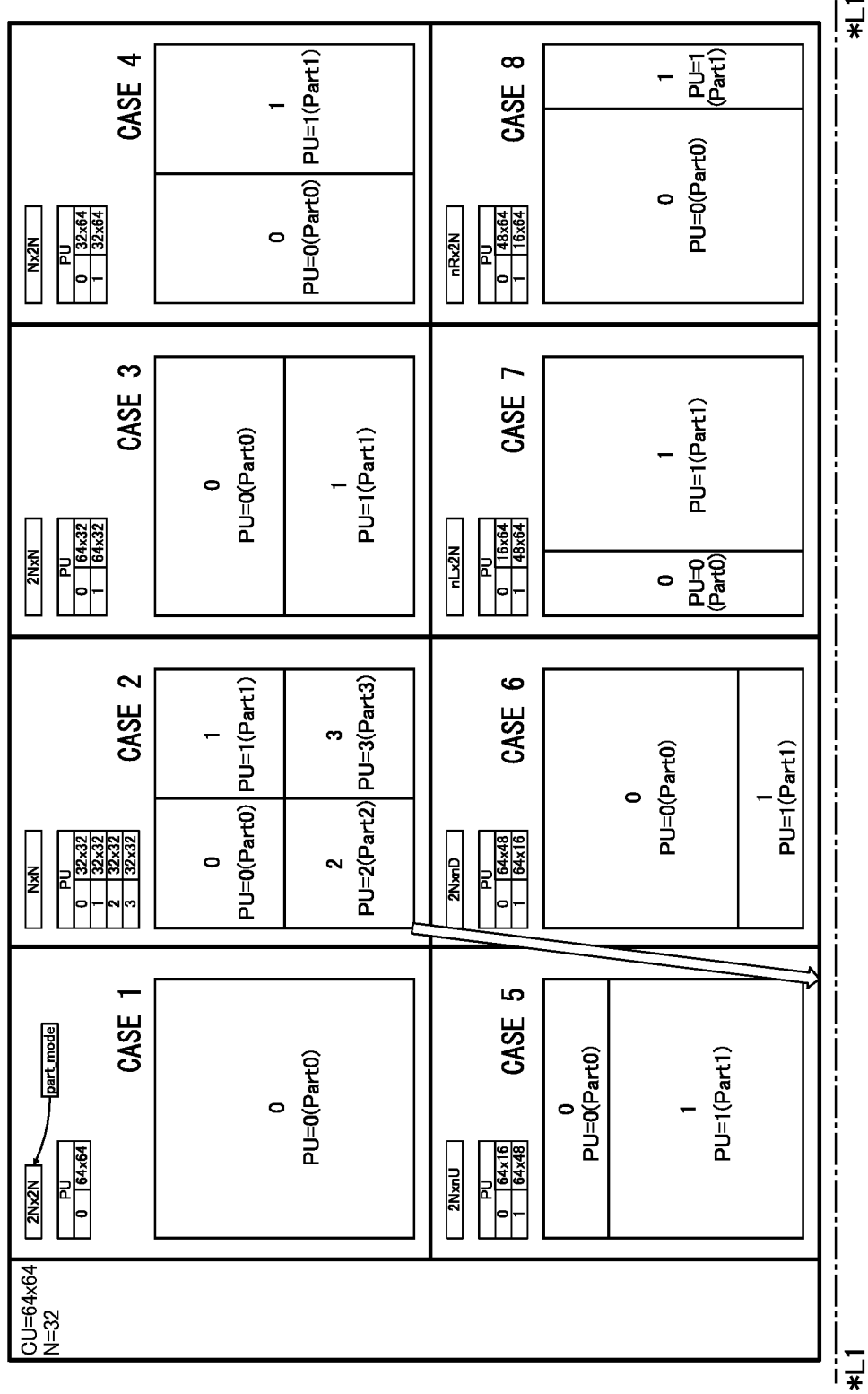
FIG. 6 is a drawing for explaining of a division size according to an example of video compression standard (part 1)
Figure 7:
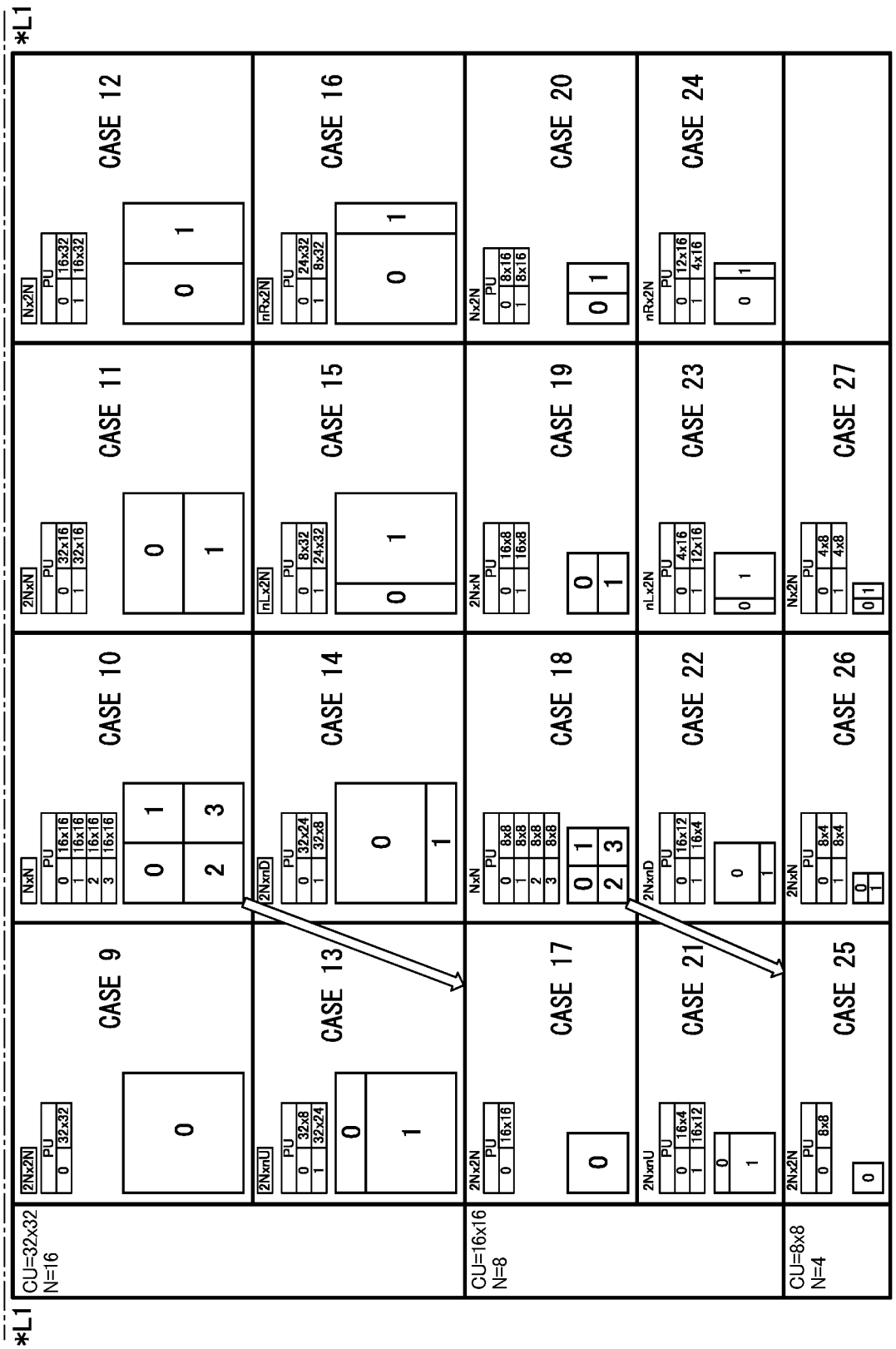
FIG. 7 is a drawing for explaining of a division size according to an example of video compression standard (part 2)

FIG. 6 and FIG. 7 are drawings for explaining division sizes according to an example of video compression standard. As illustrated in FIG. 6 and FIG. 7, various division sizes (block units: cases 1 to 27) exist in the video compression standard (HEVC (H.265)).

In the cases 1 to 8, N is assumed to be 32. The case 1 is a case where a CU=64×64 is a PU (a case where no division is made), i.e., a case of 2N×2N, and the case 1 is represented by only PU=0 (Part 0). The case 2 is a case where shaped field division is made, i.e., a case of N×N (32×32), and the case 2 is represented by PU=0 (Part 0) to PU=3 (Part 3).

Further, the case 3 is a case where division is made into two upper and lower equal parts, i.e., a case of 2N×N, and the case 3 is represented by PU=0 (Part 0) and PU=1 (Part 1). The case 4 is a case where division is made into two right and left equal parts, i.e., a case of N×2N, and the case 4 is represented by PU=0 (Part 0) and PU=1 (Part 1).

The case 5 is a case where division is made with a ratio of 16:48 in the vertical direction, i.e., a case of 2N×nU, and the case 5 is represented by 64×16 PU=0 (Part 0) and 64×48 PU=1 (Part 1). The divisions in the cases 6 to 8 may also be considered in the same manner.

In the cases 9 to 16, N is assumed to be 16. In the cases 17 to 24, N is assumed to be 8, and the other cases are the same as the case of N=32. For example, PU=0 (Part 0) to PU=3 (Part 3) divided in the case 2, i.e., each of 32×32 (pixels) blocks, correspond to the case 9 as it is, and each of 16×16 blocks divided in the case 10 corresponds to the case 17 as it is. As described above, for example, the division sizes of the cases 1 to 27 exist in the HEVC.

Figure 9:
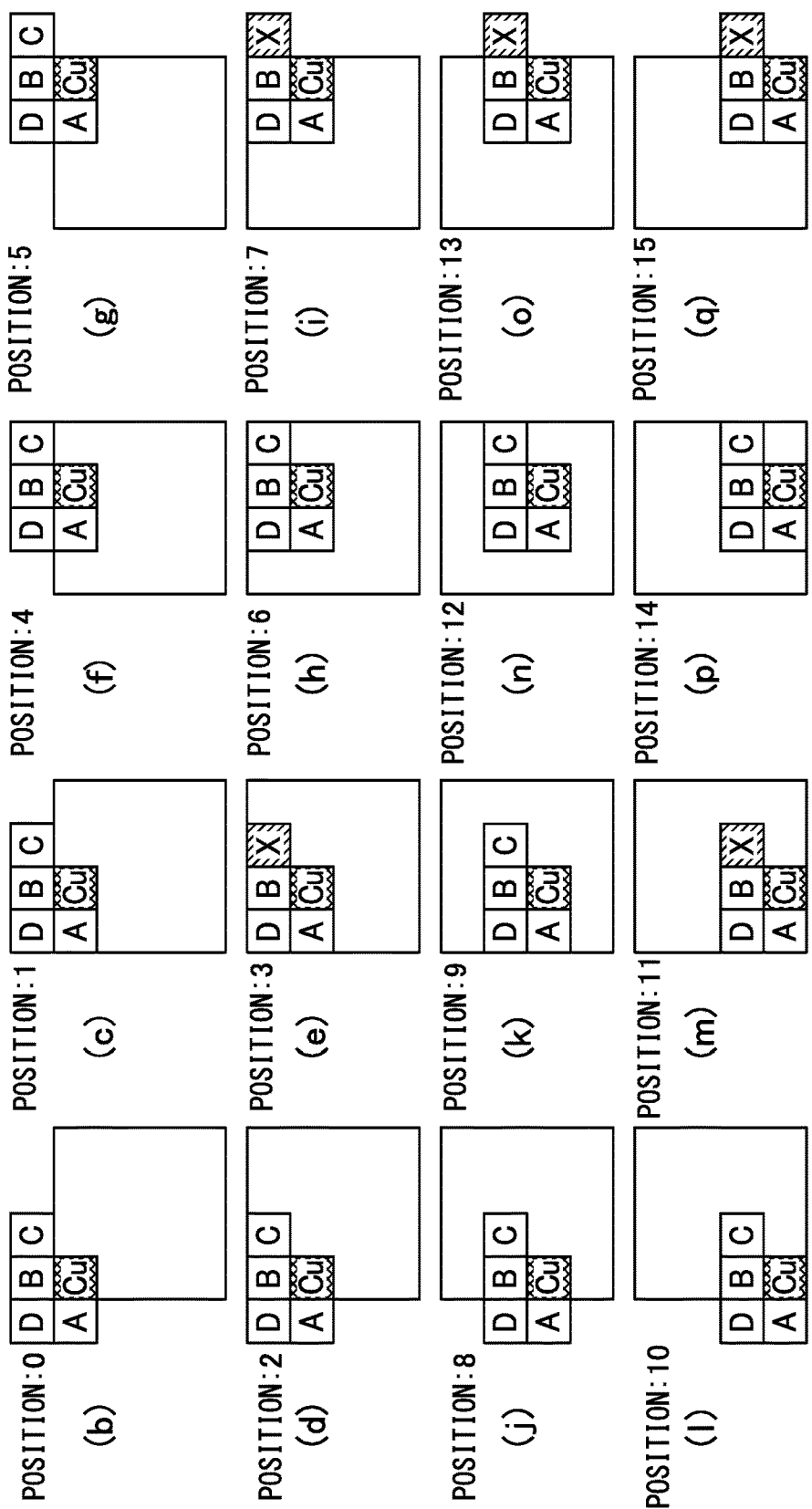
FIG. 9 is a drawing for explaining an example of motion vector decoding processing (part 2)

FIG. 8 and FIG. 9 are drawings for explaining examples of motion vector decoding processing, and are provided to explain restoration (decoding) processing of motion vector (MV). For example, FIG. 8(*a*) illustrates a case where no division is made in the CTB, and FIG. 8(*b*) to FIG. 8(*d*) illustrate a case where divisions are made in adjacent CTBs and the present CTB.

Reference symbol Cu denotes the present processing block. Reference symbols A to D denote adjacent blocks. Reference symbol MV denotes a motion vector. Reference symbol MVD denotes a prediction differential value (differential vector). Reference symbol MVP denotes an intermediate value. More specifically, reference symbol A denotes a left adjacent block with respect to the present processing block Cu. Reference symbol B denotes an immediately-above adjacent block. Reference symbol C denotes an upper right adjacent block. Reference symbol D denotes an upper left adjacent block.

It will be noted that intermediate values MVPs of A, B, C are derived as MVP=Median (MV_MB_A, MV_MB_B, MV_MB_C). But, for example, when the processing of the upper right adjacent block C is not completed, and MV_MB_C is invalid, MV_MB_D of the upper left adjacent block D is used. MV of Cu can be derived as MV=MVD+MVP.

As illustrated in FIG. 8(*a*), the decoding (restoration) of the motion vector MV of the present processing block Cu is performed by using, for example, the differential vector MVD existing in each block of the CTB and the surrounding blocks with respect to Cu (the left adjacent block A, the immediately-above adjacent block B, and the upper right adjacent block C).

When the adjacent CTBs and the present CTB are divided, for example, as illustrated in FIG. 8(*b*) to FIG. 8(*c*), the adjacent blocks A to D also change when the Cu to be processed moves to a subsequent block (a block adjacent to the right).

For example, as illustrated in FIG. 8(*d*), depending on the location of Cu, the processing of the adjacent block C is not started. Therefore, C is invalid, and D is used instead of C.

FIG. 9(*a*) illustrates a case where the inside of the CTB (64×64 (pixels)) is divided into a quadtree (shaped field) and made into 32×32 blocks, and further, four 32×32 blocks are all divided into a quadtree, and all the PUs are made into 16×16.

It will be noted that FIG. 9(*b*) to FIG. 9(*q*) correspond to the sequence of processing (0 to 15) in FIG. 9(*a*), and illustrate the position of the present processing block Cu, the positions of the adjacent blocks A to D, and whether C is valid or invalid in each of them.

As illustrated in FIG. 9(*a*), when the 16×16 PUs are processed in order from zero to fifteen, for example, in a case of FIG. 9(*e*), FIG. 9(*i*), FIG. 9(*m*), FIG. 9(*o*), and FIG. 9(*q*), the upper right adjacent block C with respect to the present processing block Cu is not decoded (has not yet been decoded). Therefore, the upper right adjacent block C is invalid "X". More specifically, the upper right adjacent block C is not used. Instead, the upper left adjacent block D is used.

In the case of FIG. 9(*k*), the upper right adjacent block C with respect to the present processing block Cu has already been decoded (the MV has already been generated). Therefore, the upper right adjacent block C ca be used as it is. In the case of the other diagrams, the MV of the upper right adjacent block C has already been generated, and the upper right adjacent block C can be used as it is. As described above, it is understood that, depending on the position of the present processing block Cu, there may be a case where the upper right adjacent block C can be used, and a case where the upper right adjacent block C is not used.

Figure 10:
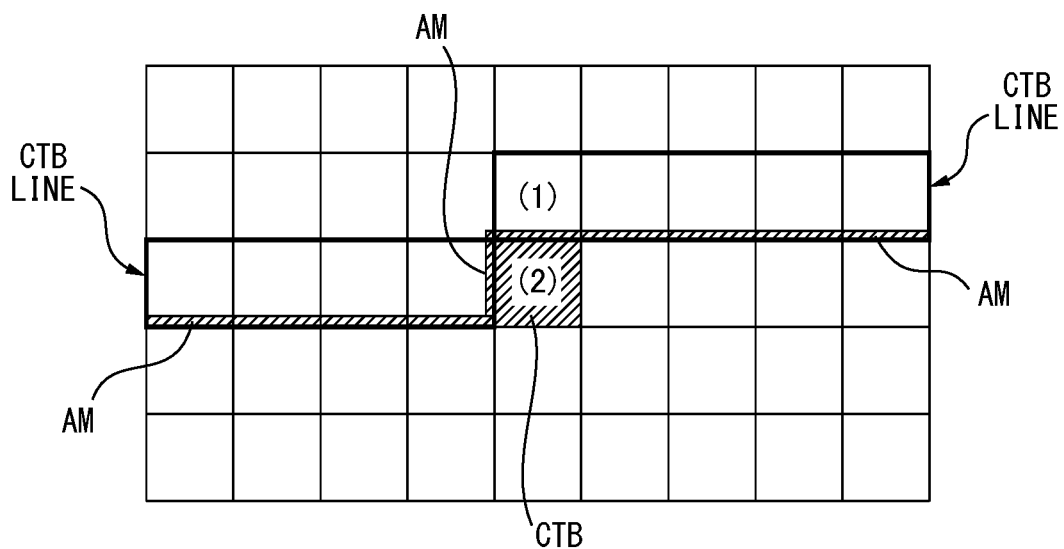
FIG. 10 is a drawing for explaining an example of an adjacent memory (part 1)
Figure 11:
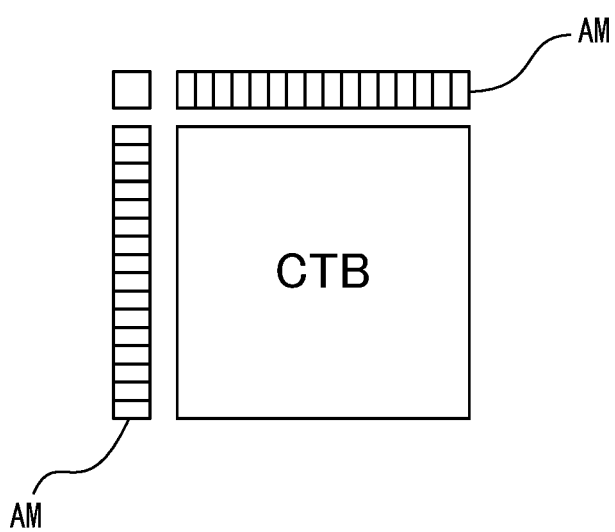
FIG. 11 is a drawing for explaining an example of an adjacent memory (part 2)

FIG. 10 and FIG. 11 are drawings for explaining an example of the adjacent memory. In FIG. 10 and FIG. 11, reference symbol AM denotes the adjacent memory. As illustrated in FIG. 10, for example, when the CTB at the position (1) is processed, the data of the motion vector MV at the end of the screen are held in the adjacent memory AM. For example, when the CTB at the position (2) is processed, the CTB at the position (1) is used as the immediately-above adjacent block (B).

The adjacent memory AM is considered to have the maximum memory capacity for dividing, for example, all of the 64×64 CTB into 4×8 blocks. More specifically, since various cases may be considered as the block division of the CTB, the capacity of the adjacent memory AM is preferably determined while considering the case where the largest capacity is used.

Figure 12:
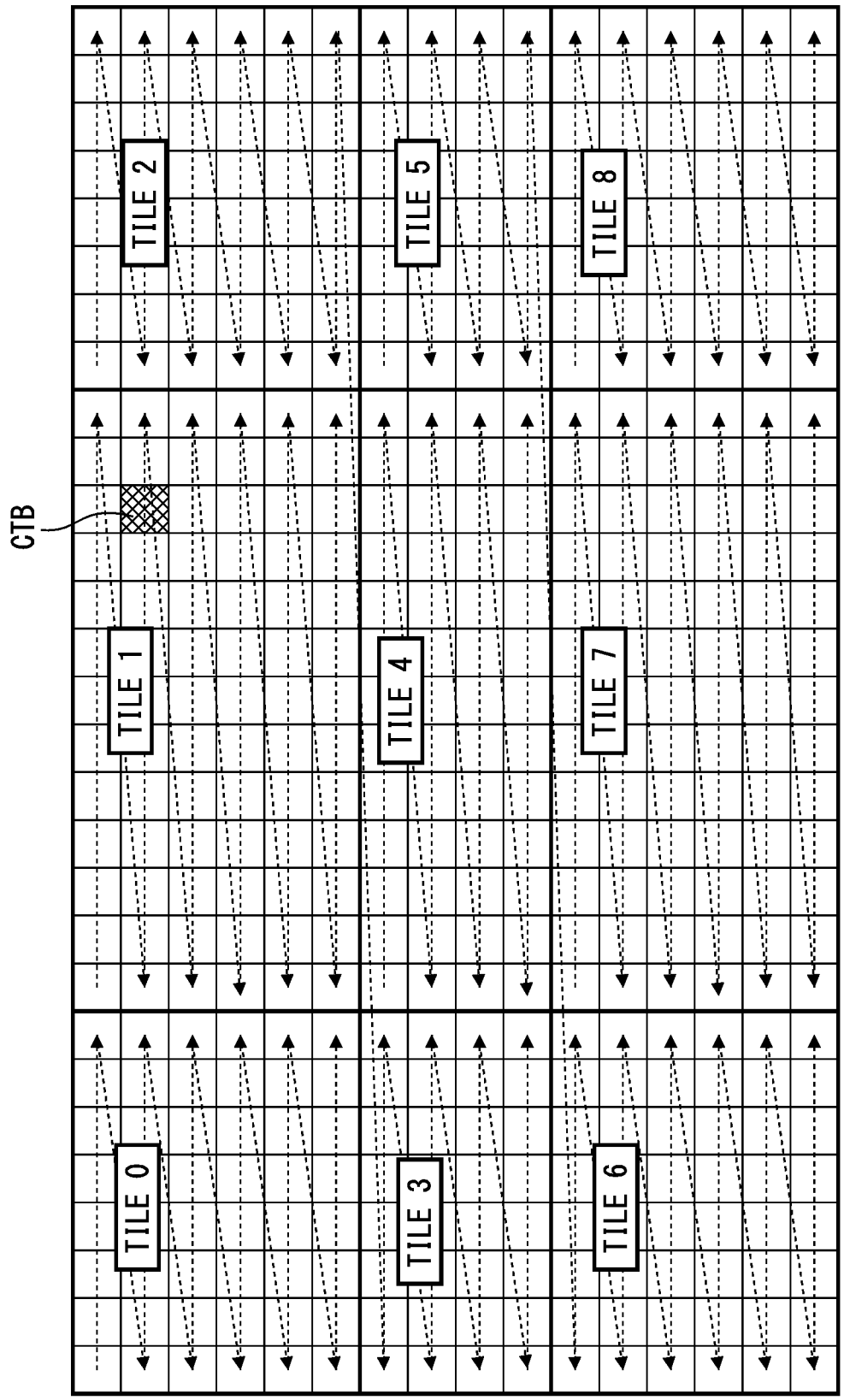
FIG. 12 is a drawing for explaining an example of tile division within a picture.

FIG. 12 is a drawing for explaining an example of tile division in the picture, and illustrates how a single picture is divided into nine tiles (Tiles) 0 to 8. As illustrated in FIG. 12, for example, in the HEVC, tile division may be done within a single picture.

In the example as illustrated in FIG. 12, the tiles 0, 2, 6, and 8 are assumed to have the same size, the tiles 1 and 7 are assumed to have the same size, and the tiles 3 and 5 are assumed to have the same size.

As described above, when a single picture is divided into nine tiles 0 to 8, the tiles do not have any dependency of A, B, C (D) with regard to Cu explained above. Therefore, independent processing can be performed in each of the tiles.

More specifically, for example, multiple arithmetic processing units (cores: Cores) can be used, and the cores can operate in parallel to perform processing of tiles corresponding to the cores.

Figure 13:
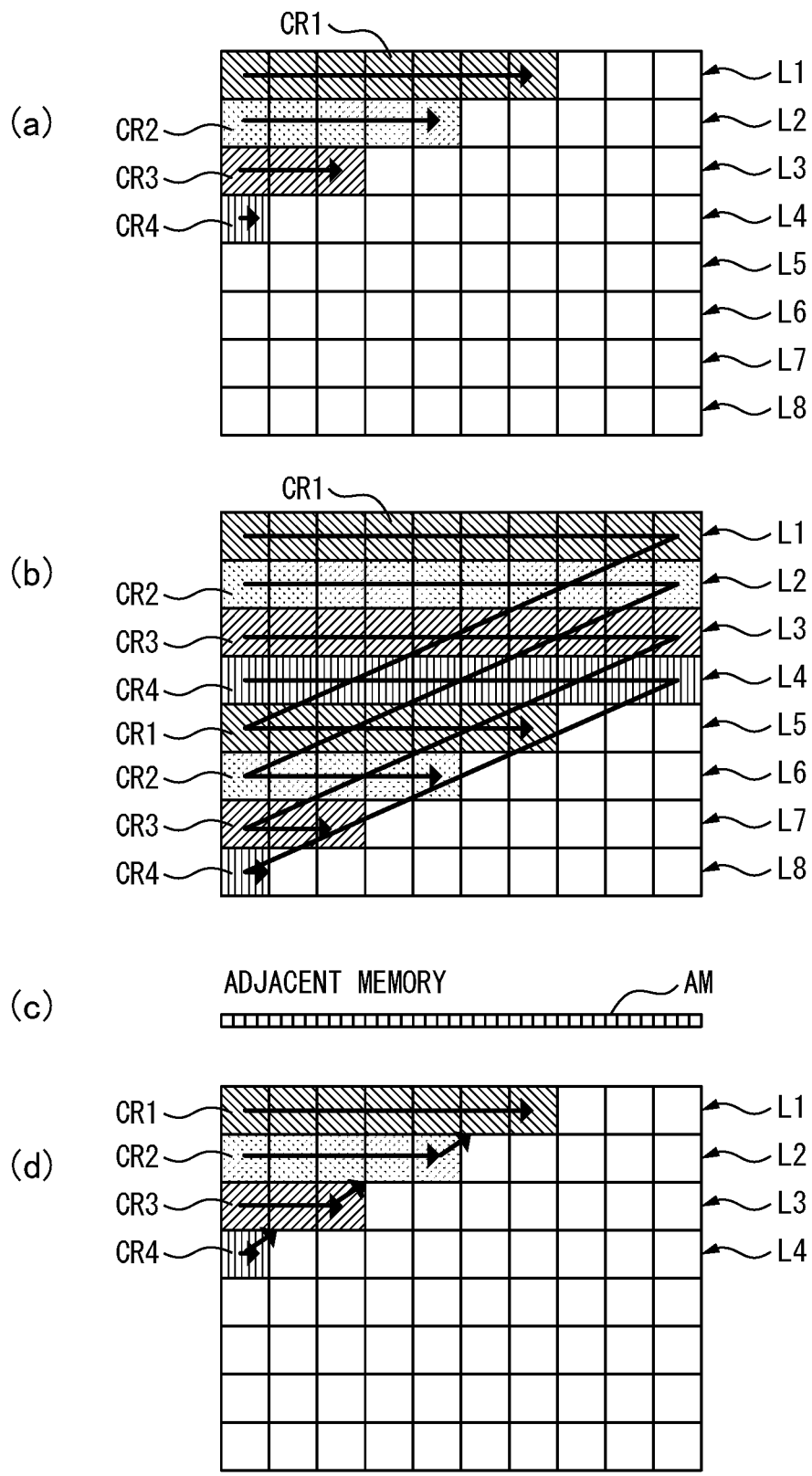
FIG. 13 is a drawing for explaining allocation of the cores for each CTB line.

FIG. 13 is a drawing for explaining allocation of cores for each CTB line (image block line). In the following explanation, the number of cores is four, but it is to be understood that the number of cores is not limited to four. FIG. 13(*a*) and FIG. 13(*b*) illustrate decoding processing with four cores. FIG. 13(*c*) illustrates the adjacent memory AM, and FIG. 13(*d*) illustrates a late-operating core is at a stop until an adjacent condition is satisfied.

As illustrated in FIG. 13(*a*) and FIG. 13(*b*), four cores CR1 to CR4 are allocated to CTB lines L1 to L4, L5, to L8 respectively corresponding thereto, and perform the decoding processing of each block.

For example, the CR1 performs processing of L5 when the processing of L1 is completed (finished), the CR2 performs processing of L6 when the processing of L2 is finished, the CR3 performs processing of L7 when the processing of L3 is finished, and then, the CR4 performs processing of L8 when the processing of L4 is finished. As illustrated in FIG. 13(c), the adjacent memory AM processes only one block at a time. Therefore, the adjacent memory AM has a memory capacity for a single CTB line.

As illustrated in FIG. 13(d), when the cores CR1 to CR4 are allocated for each CTB line, for example, the late-operating core is at a stop until the adjacent condition is satisfied. More specifically, when the motion vector MV of the present processing block Cu is restored, for example, the core CR2 is at a stop until the processing of the core CR1 is completed when the core CR1 is not finished the processing of the upper right adjacent block C of Cu. This also occurs with the CR3 and CR4, and results in a delay in the processing.

Figure 14:
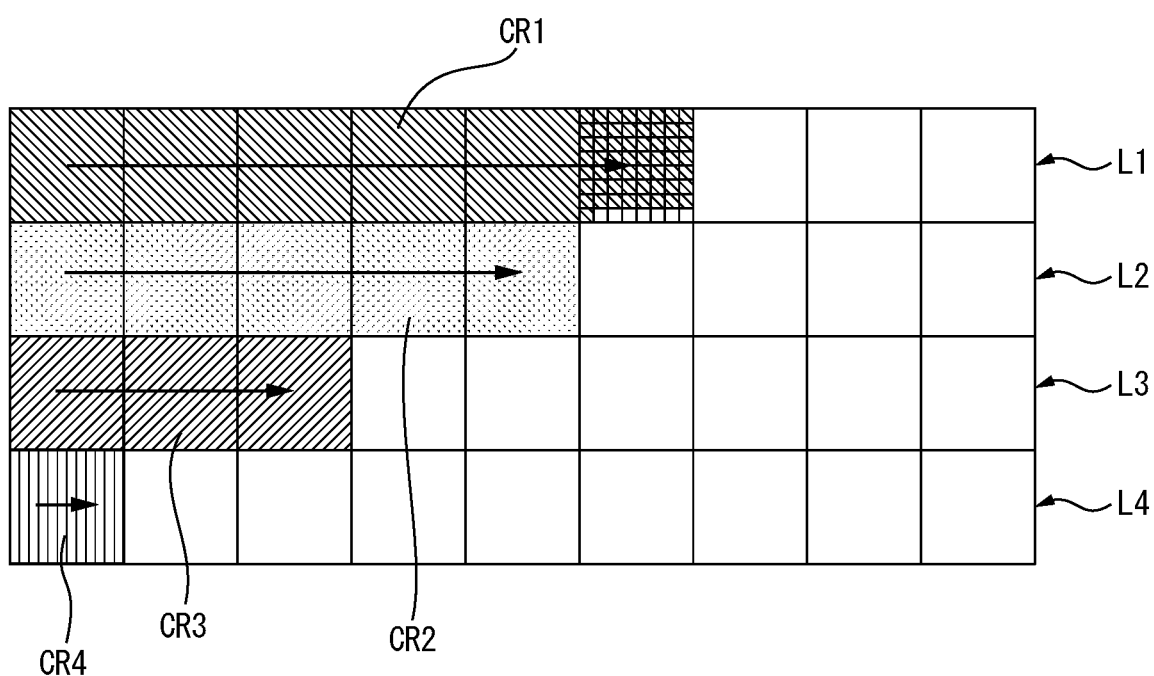
FIG. 14 is a drawing for explaining a problem associated with allocation of the cores for each CTB line as illustrated in FIG. 13.

FIG. 14 is a drawing for explaining a problem in allocation of cores for CTB lines as illustrated in FIG. 13. As illustrated in FIG. 14, when tile division is not made, the cores CR1 to CR4 are allocated to the CTB lines L1 to L4 respectively corresponding thereto in normal operation.

Therefore, as explained with reference to FIG. 13(d), the core of the lower side CTB is at a stop until the adjacent condition of the upper side CTB is satisfied. For example, when the core CR1 is not generated data (MV) of the adjacent block (upper right adjacent block C) used for the present processing block Cu processed by the core CR2, the core CR2 stops processing until the core CR1 finishes the generation.

When there are many blocks of which the division size is small, e.g., the right end block in the CTB line L1 in FIG. 14, the processing time with the CR1 increases, and as a result, the waiting time of the CR2 also increases. More specifically, when the number of division size of the blocks to be processed is high, this results in a greater effect of the delay due to the stop of the processing.

Figure 15:
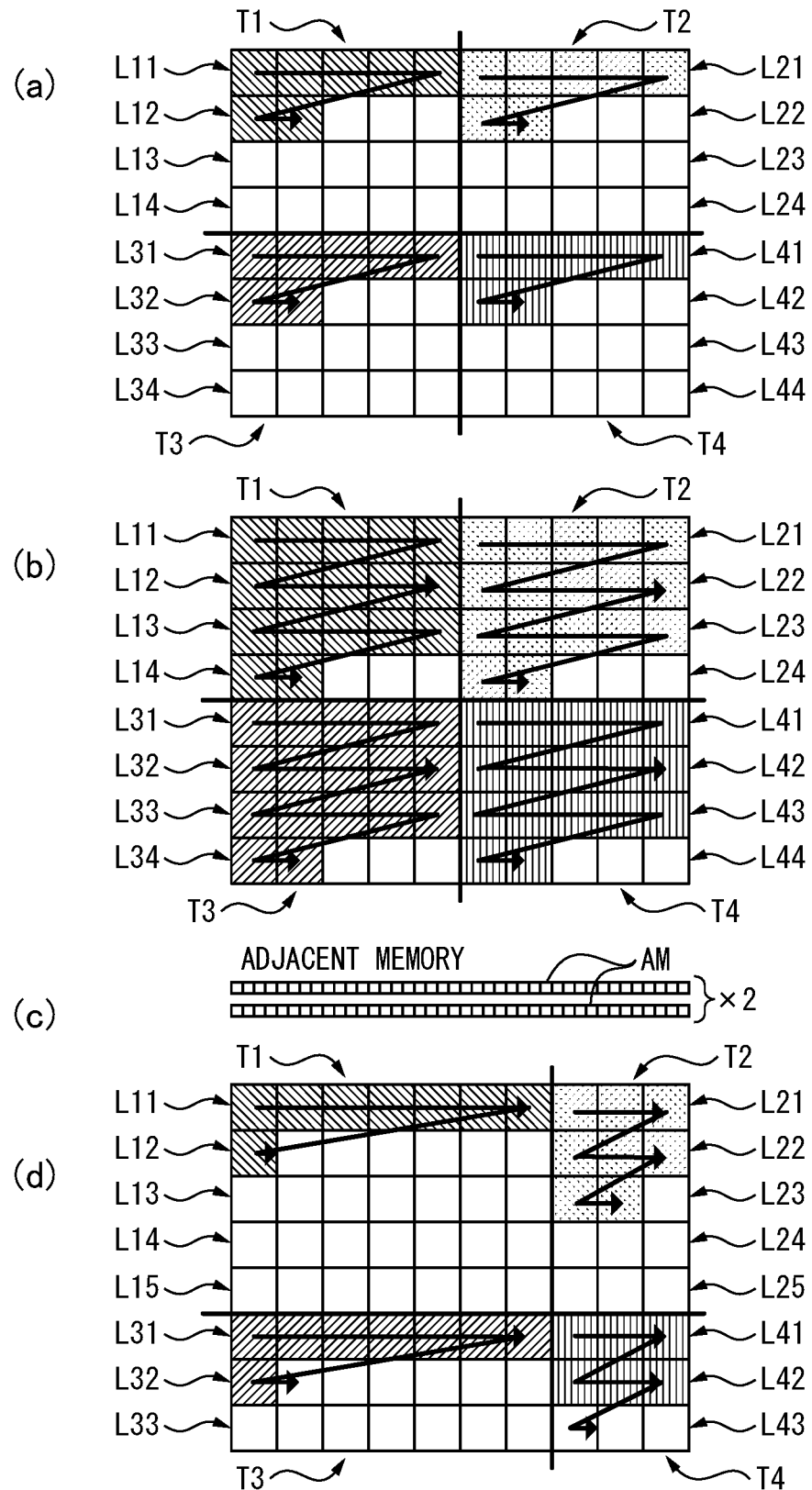
FIG. 15 is a drawing for explaining allocation of the cores for each tile.

FIG. 15 is a drawing for explaining allocation of cores to tiles. FIG. 15(a) and FIG. 15(b) illustrate decoding processing in which four tiles of the same size are decoded with four cores. FIG. 15(c) illustrates the adjacent memories AM. FIG. 15(d) illustrates a case where the sizes of the tiles are different.

As illustrated in FIG. 15(a) and FIG. 15(b), the four cores CR1 to CR4 are allocated to the CTB lines of the tiles T1 to T4 respectively corresponding thereto, and performs the decoding processing of the blocks. In the four tiles T1 to T4, the processing is performed in parallel with the cores CR1 to CR4.

More specifically, in the tile T1, the core CR1 processes the CTB lines L11 to L14 in order, and in the tile T2, the core CR2 processes the CTB lines L21 to L24 in order. In the tile T3, the core CR3 processes the CTB lines L31 to L34 in order, and in the tile T4, the core CR4 processes the CTB lines L41 to L44 in order.

As described above, when the cores are allocated to the tiles, the processing of the tiles can be performed in parallel, so that the processing can be performed at a higher speed. However, for example, when the four tiles T1 to T4 are processed with the four cores CR1 to CR4, two adjacent memories AM may be used at a time. Therefore, a capacity twice as large as FIG. 13(c) is prepared for the adjacent memory AM. More specifically, for example, a capacity as large as the number of lines in the vertical direction of the tiles may be prepared for the capacity of the adjacent memory.

Further, as illustrated in FIG. 15(d), the size of each of the tiles T1 to T4 obtained by dividing the CTB is not necessarily the same. For example, the size of the tile (T4) is small, and the core CR4 having finished the processing in a short time stops without any further processing.

More specifically, various image processing techniques may be considered to efficiently perform image processing by using multiple cores, but with the recent increase in the screen size and the higher resolution, waiting times of cores occur, for example, in the sequence of processing of decoding. Such waiting times of the cores result in delay in the overall image processing.

Figure 16:
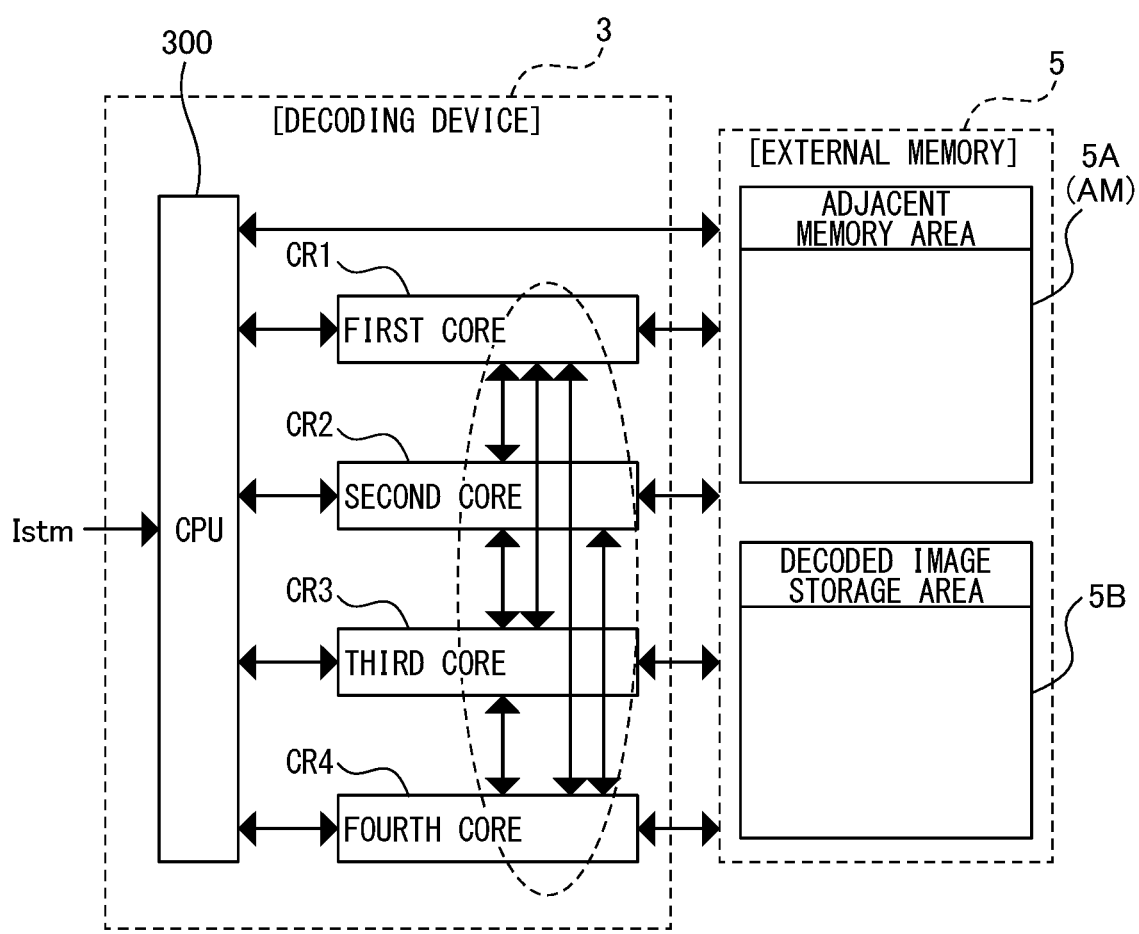
FIG. 16 is a block diagram illustrating an example of an image processing apparatus according to the present embodiment.

Hereinafter, embodiments of an image processing apparatus and an image processing method will be described in details with reference to appended drawings. FIG. 16 is a block diagram illustrating an example of an image processing apparatus according to the present embodiment. The image processing apparatus as illustrated in FIG. 16 corresponds to the decoding device 3 explained with reference to FIG. 1, but FIG. 16 is drawn with an attention given to the four cores CR1 to CR4.

As illustrated in FIG. 16, the image processing apparatus (decoding device) 3 according to the present embodiment receives and decodes an image stream Istm such as, e.g., an HEVC stream, generates a decoded output image Iout such as a 4K image and the like, and outputs the output image Iout to the external memory 5 (decoding image storage area 5B).

The decoding device 3 includes an arithmetic processing device (CPU: Central Processing Unit) 300 for performing overall control in the decoding device 3 and four cores (the first to the fourth core) CR1 to CR4. The CPU 300 receives the image stream Istm, and analyzes tile and division situations and the like, and the CPU 300 distributes the processing to the first to the fourth the cores CR1 to CR4 for each tile, each CTB line (image block line), and the like.

The first core CR1 performs the decoding processing of the tile or the CTB line distributed by the CPU 300 that performs the overall control. The first core CR1 monitors the processing state the other cores, i.e., the second, the third, and the fourth cores CR2, CR3, and CR4. Further, when the first core CR1 detects waiting of the upper end CTB line processing, which will be explained later, the first core CR1 performs support processing of the upper end line.

The second core CR2 performs the decoding processing of the tile or the CTB line distributed by the CPU 300, and monitors the processing state the other cores, i.e., the first, the third and the fourth cores CR1, CR3, and CR4. When the second core CR2 detects waiting of the upper end CTB line processing, the second core CR2 performs support processing of the upper end line.

The third core CR3 performs the decoding processing of the tile or the CTB line distributed by the CPU 300, and monitors the processing state the other cores, i.e., the first, the second and the fourth cores CR1, CR2, and CR4. When the third core CR3 detects waiting of the upper end CTB line processing, the third core CR3 performs support processing of the upper end line.

The fourth core CR4 performs the decoding processing of the tile or the CTB line distributed by the CPU 300, and monitors the processing state the other cores, i.e., the first, the second and the third cores CR1, CR2, and CR3. When the fourth core CR4 detects waiting of the upper end CTB line processing, the fourth core CR4 performs support processing of the upper end line.

The external memory 5 includes an adjacent memory area 5A used as an adjacent memory AM and a decoding image storage area 5B storing an output image Iout such as a 4K image and the like decoded by the decoding device 3.

The first to the fourth the cores CR1 to CR4 reads and writes data to and from the adjacent memory area 5A, and the decoding image storage area 5B writes images decoded by the first to the fourth the cores CR1 to CR4.

Figure 17:
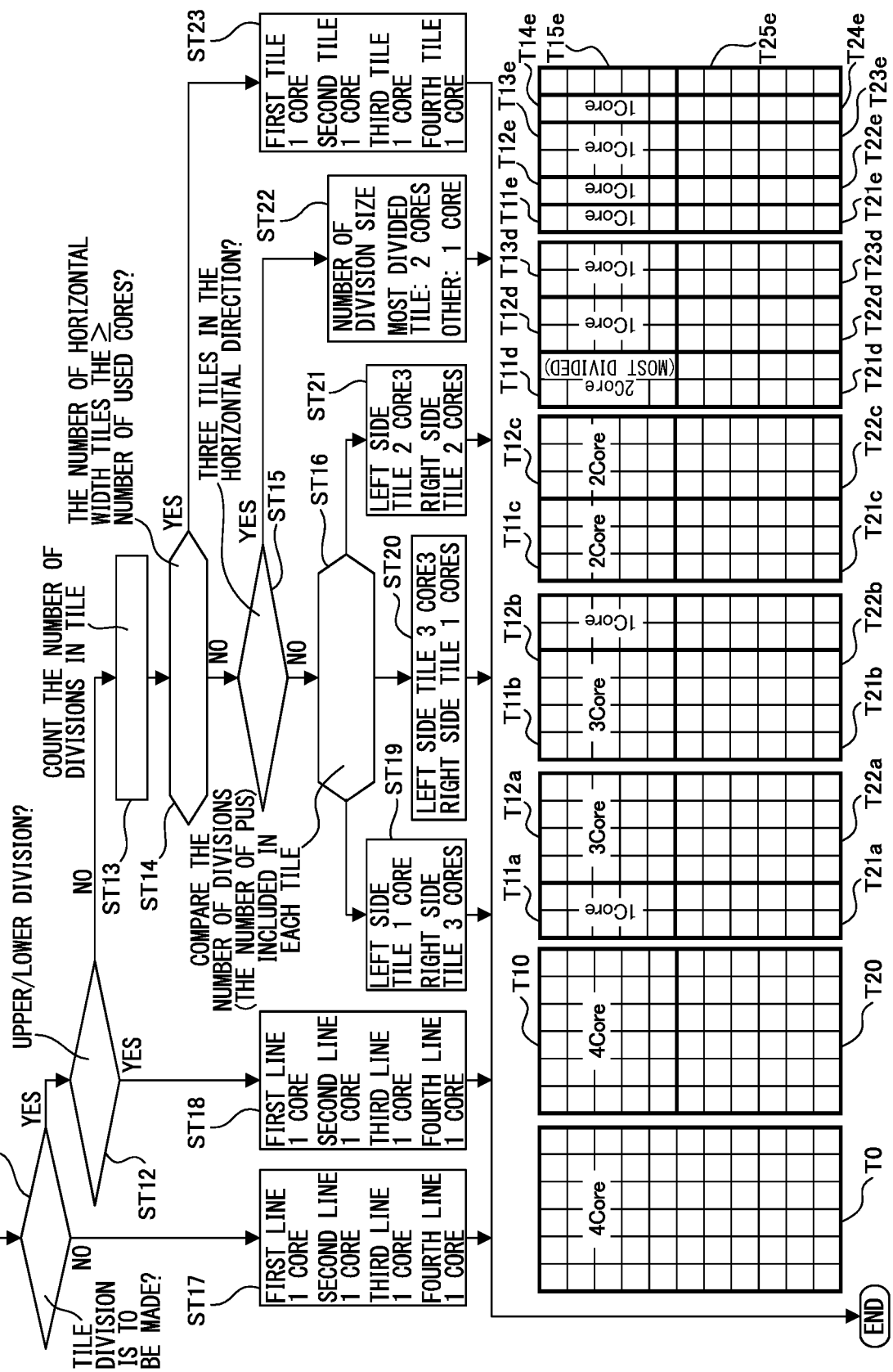
FIG. 17 is a flowchart for explaining an example of allocation processing of the cores according to the first embodiment that is applied to the image processing apparatus as illustrated in FIG. 16.

FIG. 17 is a flowchart for explaining an example of allocation processing of the cores according to the first embodiment that is applied to the image processing apparatus as illustrated in FIG. 16, and illustrates an example of processing in a case where the number of used cores (COREs) is four.

As illustrated in FIG. 17, when the allocation processing of the cores is started (START), first, in step ST11, a determination is made as to whether tile (Tile) division is made in image data to be processed. In FIG. 17, 1 CORE, which is to be allocated, corresponds to each core of the first core CR1, the second core CR2, the third core CR3, and the fourth core CR4.

2 COREs, which are to be allocated, correspond to, for example, two cores of CR1 and CR2, and CR3 and CR4, and 3 COREs correspond to, for example, three cores of CR1 to CR3 or CR2 to CR4.

When tile division is determined not to be made (NO) in step ST11, step ST17 is subsequently executed, and in the same manner as what has been explained with reference to FIG. 13, four cores are allocated to a single tile T0. More specifically, in image data (tile T0), four cores are allocated to corresponding lines as the first line 1 CORE (core), the second line 1 CORE, the third line 1 CORE, and the fourth line 1 CORE.

For example, the core having finished the processing of the first line is subsequently allocated to the fifth line. The core having finished the processing of the second line is subsequently allocated to the sixth line. The core having finished the processing of the third line is subsequently allocated to the seventh line. More specifically, when tile division is not made, all of the four cores are used for a single tile T0, and the four cores perform the parallel processing of the CTB.

On the other hand, when tile division is determined to be made (YES) in step ST11, step ST12 is subsequently executed, and a determination is made as to whether tile division is made only in the upper/lower division. When tile division is determined to be made only in the upper/lower division (YES) in step ST12, step ST18 is subsequently executed, and, for example, four cores are allocated as the first line 1 CORE, the second line 1 CORE, the third line 1 CORE, and the fourth line 1 CORE of the upper side tile T10.

For example, the core having finished the processing of the first line of the upper side tile T10 is subsequently allocated to the fifth line of the upper side tile T10, and performs the processing of the upper side tile T10. Then, when the processing of the upper side tile T10 is finished, for example, four cores are allocated as the first line 1 CORE, the second line 1 CORE, the third line 1 CORE, and the fourth line 1 CORE of the lower side tile T20.

More specifically, when tile division is made only in the upper/lower division, for example, all of the four cores are used for the upper side tile T10, and the four cores perform the parallel operation of the CTB. Then, when the processing of the upper side tile T10 is finished, all of the four cores are used for the lower side tile (subsequent tile) T20, and the four cores perform the parallel operation of the CTB.

As described above, in a case of the upper/lower division, the cores are not allocated to the upper and lower tiles T10, T20 in a divided manner, so that this does not increase (double) the capacity of the adjacent memory, which is needed when the parallel processing is performed with multiple tiles in the vertical direction. In other words, the processing is performed while the capacity of the adjacent memory stays one line, so that the scale of the circuit does not increase.

Subsequently, when tile division is determined not to be made only in the upper/lower division (NO) in step ST12, step ST13 is subsequently executed, and the number of divisions in the tile is counted, and further, step ST14 is subsequently executed.

In step ST14, a determination is made as to whether the number of tiles in the horizontal direction is equal to or more than the number of used cores (the number of horizontal width Tiles≥the number of used COREs?), and when the number of tiles in the horizontal direction is determined be equal to or more than the number of used cores (four) (YES), step ST23 is subsequently executed.

For example, when the number of tiles in the horizontal direction is five, this is more than the number of cores, i.e., four. Therefore, a single core is allocated to each of the tiles in the horizontal direction (tiles in the horizontal direction at the upper side) T11e to T14e.

More specifically, four cores are allocated, from the left at the upper side, as the first tile (the first Tile: T11e) 1 CORE, the second Tile (T12e) 1 CORE, the third Tile (T13e) 1 CORE, the fourth Tile (T14e) 1 CORE. For example, the core that has finished processing of the first Tile (T11e) at the upper side is subsequently allocated to the fifth Tile (T15e) at the upper side.

When the number of tiles in the horizontal direction is determined not to be equal to or more than the number of used cores (NO) in step ST14, step ST15 is subsequently executed, and a determination is made as to whether the number of tiles in the horizontal direction is three (3 horizontal width Tiles?).

When the number of tiles in the horizontal direction is determined to be three (YES) in step ST15, step ST22 is subsequently executed, and two cores are allocated to the tiles of which the number of division size is the largest, and one core is allocated to the remaining tiles (two tiles). More specifically, all the four cores are allocated to three tiles in the horizontal direction for a single line at the upper side, and no core is allocated to three tiles at the lower side.

In the drawing of step 22 in FIG. 17, the sizes of the three tiles T11d, T12d, T13d are all the same. Therefore, for the sake of convenience, 2 COREs are allocated to the left end (upper left end) tile T11d.

When the number of tiles in the horizontal direction is determined not to be three (NO: the number of tiles in the horizontal direction is two) in step ST15, step ST16 is subsequently executed, and the number of divisions (the number of PUs (Prediction Units)) included in each tile are compared.

When the PUs in the right side tile is more than the PUs in the left side tile in step ST16, step ST19 is subsequently executed, and, for example, three cores (right side Tile 3 COREs) are allocated to the right side tile T12a, and one core (left side Tile 1 CORE) is allocated to the left side tile T11a. More specifically, all of the four cores are allocated to the two tiles in the horizontal direction for one line at the upper side, and no core is allocated to two tiles at the lower side.

When the PUs in the right side tile are less than the PUs in the left side tile in step ST16, step ST20 is subsequently executed, and, for example, one core (right side Tile1 CORE) is allocated to the right side tile T12b, and three cores (left side Tile3 COREs) are allocated to the left side tile T11b. More specifically, all of the four cores are allocated to two tiles in the horizontal direction for one line at the upper side, and no core is allocated to two tiles at the lower side.

Further, when the PUs in the right side tile and the PUs in the left side tile are determined to be equivalent in step ST16, step ST21 is subsequently executed, for example, two cores (right side Tile 2 COREs) are allocated to the right side tile T12c, and two cores (left side Tile 2 COREs) are allocated to the left side tile T11c. More specifically, all of the four cores are allocated to two tiles in the horizontal direction for one line at the upper side, and no core is allocated to two tiles at the lower side.

In each of steps ST18 to ST23, after the processing of the tiles at the upper side (T10, T11a to T15e) is finished, the core is allocated to the tiles at the lower side (T20, T21a, to T25e), and the tiles at the lower side are processed.

As described above, according to the first embodiment, when the division of the tile is made in the upper/lower division, the cores are not allocated to the upper and lower tiles in a divided manner, so that processing can be performed while the capacity of the adjacent memory stays one line, without performing parallel processing with multiple tiles in the vertical direction.

Figure 18:
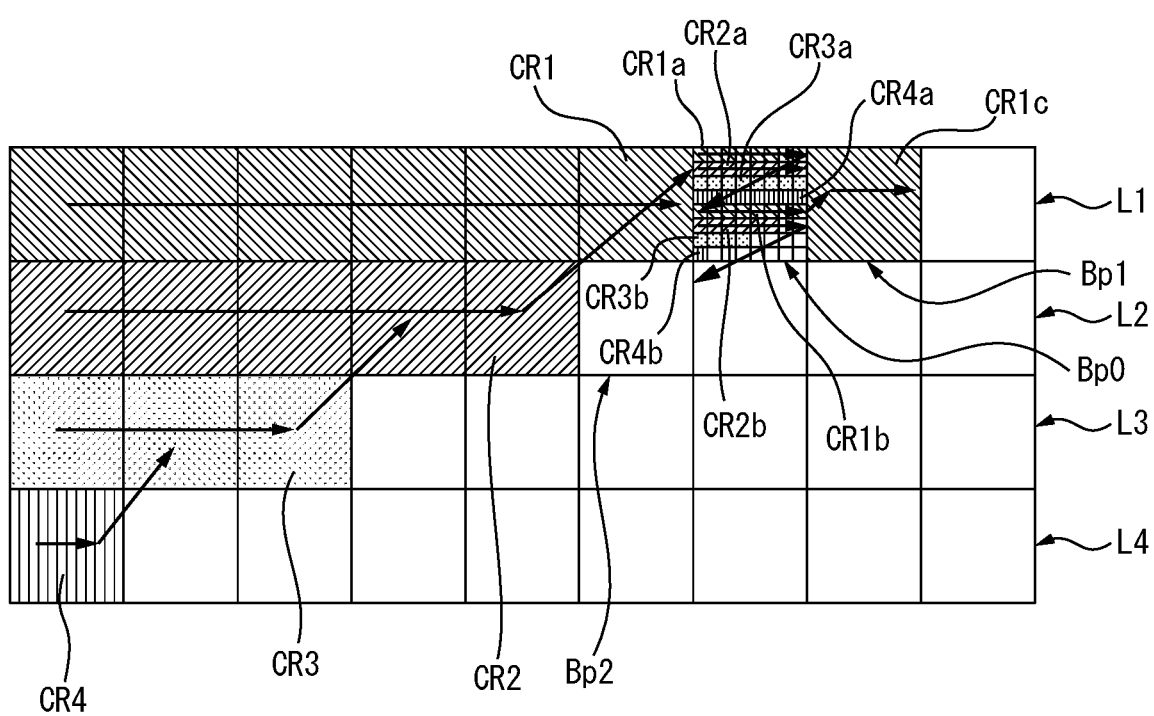
FIG. 18 is a drawing for explaining allocation processing of the cores according to the second embodiment that is applied to the image processing apparatus as illustrated in FIG. 16.

FIG. 18 is a drawing for explaining allocation processing of cores according to the second embodiment that is applied to the image processing apparatus as illustrated in FIG. 16, and FIG. 18 explains processing for avoiding (alleviating) waiting processing. For example, FIG. 18 shows an example of a case where four cores are used for processing a single tile in step ST17 (ST18) in FIG. 17 explained above.

As explained with reference to FIG. 17, when cores corresponding to tiles are allocated (distributed) and thereafter, for example, two or more cores are used for a single tile, the parallel processing of the CTB line is performed. For example, when the number of divisions of the CTB line at the upper side is high, and waiting processing occurs in the CTB line at the lower side, division situation at the upper end CTB line side is determined, and processing of the upper end CTB line side is performed.

As illustrated in FIG. 18, four cores CR1 to CR4 are allocated to corresponding CTB lines L1 to L3. FIG. 18 shows, in the CTB line L1 at the uppermost end, for example, the division size increases remarkably during the processing, and since the core CR1 is not finished generation of the block Bp0, the core CR2 processing the second CTB line L2 from the top is kept waiting.

More specifically, when the core CR2 processing the second CTB line L2 is kept waiting, the core CR3 processing the third CTB line L3 and the core CR4 processing the fourth CTB line L4 after that are also kept waiting.

Therefore, in the allocation processing of the cores according to this second embodiment, not only the core CR1 processing the original CTB line L1 but also the cores CR2 to CR4 kept waiting unless the processing of the block Bp0 is finished are allocated to the block Bp0 for which the processing is not finished.

More specifically, it is difficult to start the processing of the lower side CTB until the processing of the upper side CTB is finished. Therefore, when there is a core at stop due to waiting, the core is configured to help the processing of the upper side CTB at the time in which the core is stopped.

In other words, the state in which the lower side cores CR2 to CR4 processing the second and subsequent CTB lines L2 to L4 are kept waiting and the state in which parallel processing operation can be performed for the uppermost end CTB line L1 are determined, and, for example, the processing of the CTB in which there are many divisions in the uppermost end CTB line L1 is processed with the highest level of preference.

For example, in the block Bp0, the core CR1 is caused to perform processing in the same manner as CR1a, CR1b, the core CR2 is caused to perform processing in the same manner as CR2a, CR2b, the core CR3 is caused to perform processing in the same manner as CR3a, CR3b, and the core CR4 is caused to perform processing in the same manner as CR4a and CR4b.

After the processing of the block Bp0 with the four cores CR1 to CR4 is finished, for example, the core CR1 processes a block Bp1 subsequent to Bp0 in the CTB line L1 at the uppermost end. After the processing of Bp0 is finished, for example, the core CR2 returns back to the original processing to process the block Bp2 in the second CTB line L2.

As described above, according to the second embodiment, the core which is kept waiting in the processing is allocated to a preferentially processed block which is the cause of making the core in the waiting state. Therefore, the overall processing time can be reduced.

Figure 21A:
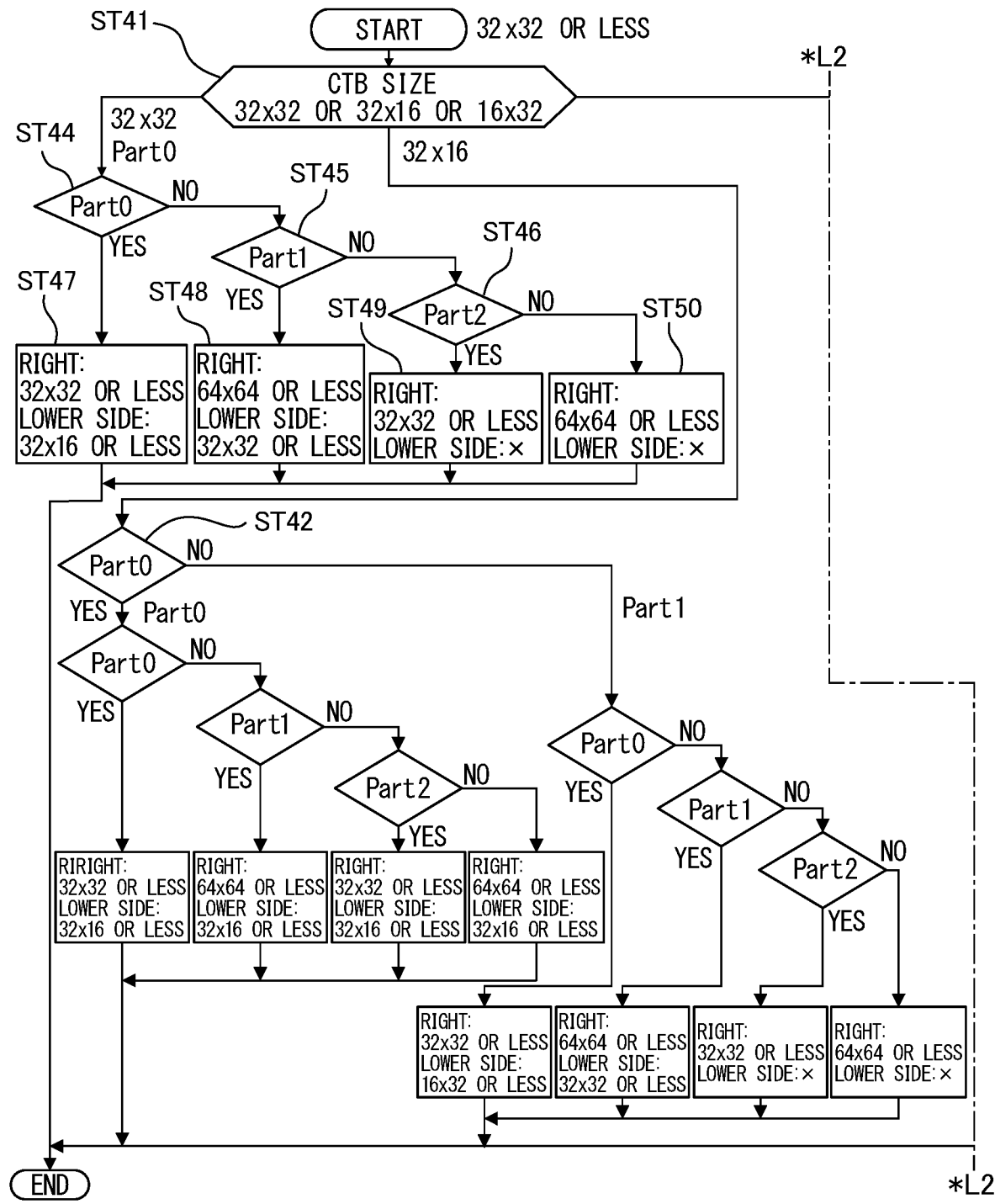
FIG. 21A and FIG. 21B are a flowchart for explaining an example of allocation processing of the cores according to the second embodiment (part 2)
Figure 21B:
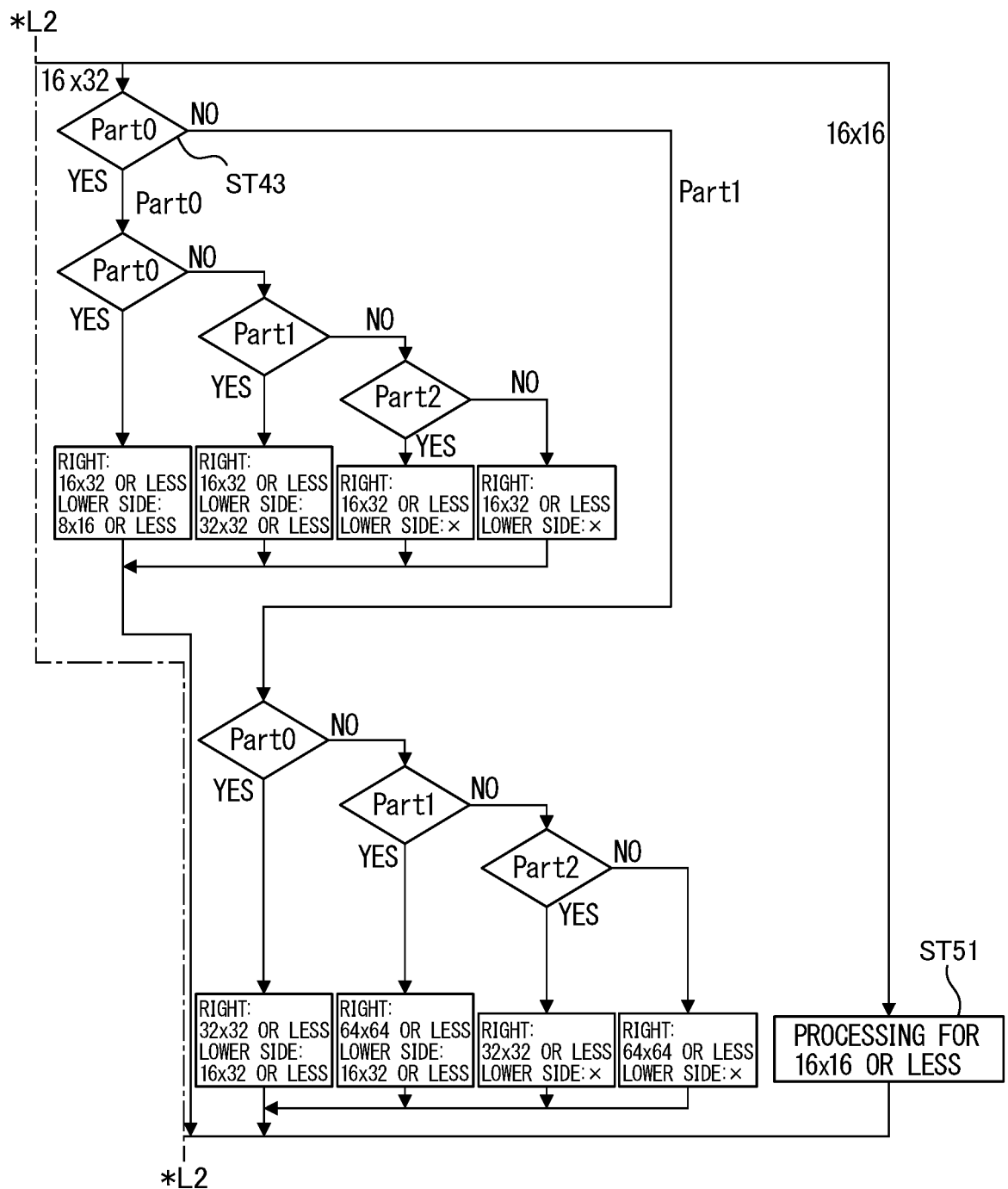
Figure 22:
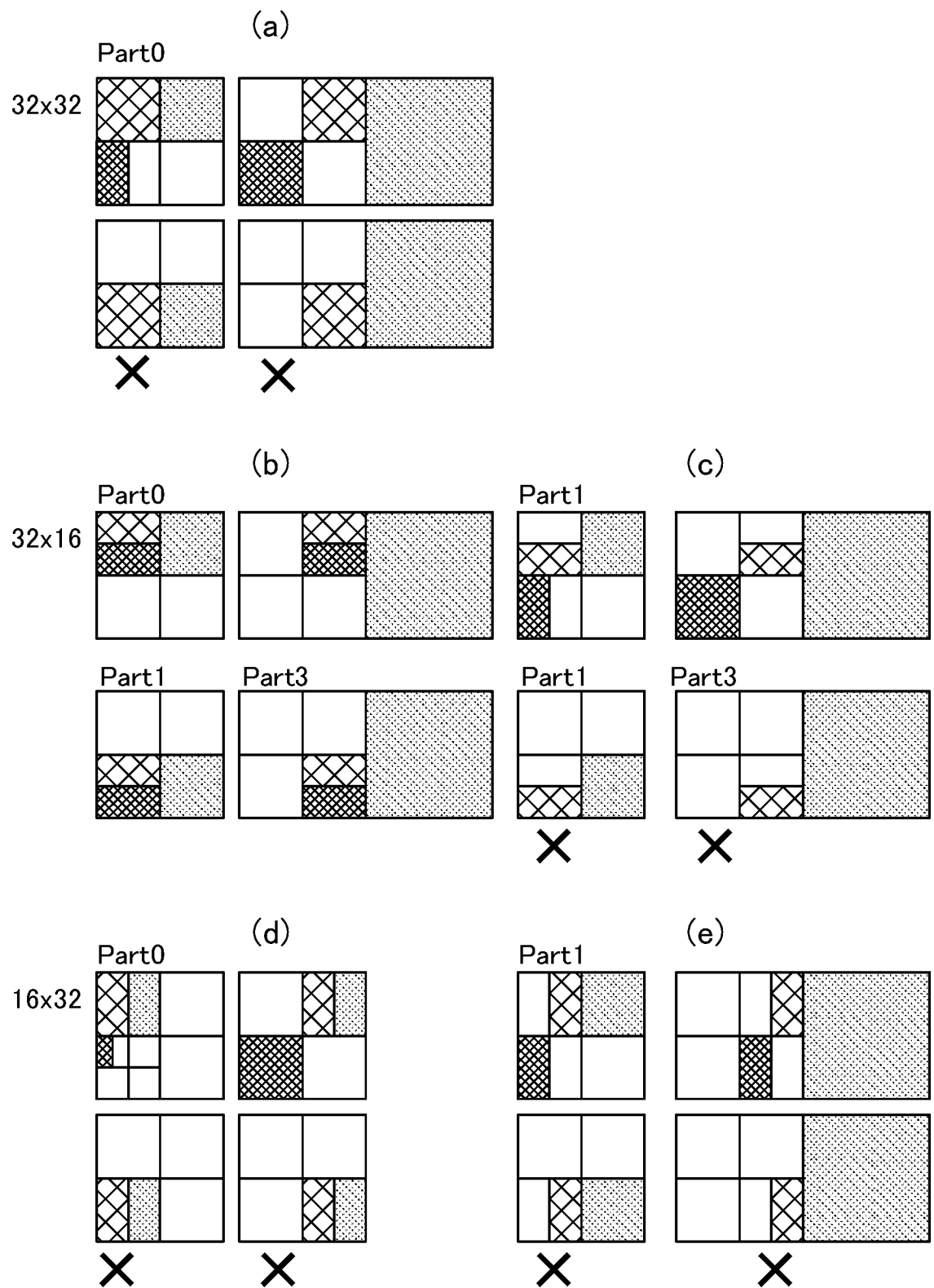
FIG. 22 is a drawing for explaining processing according to the flowchart illustrated in FIG. 21A and FIG. 21B.
Figure 23A:
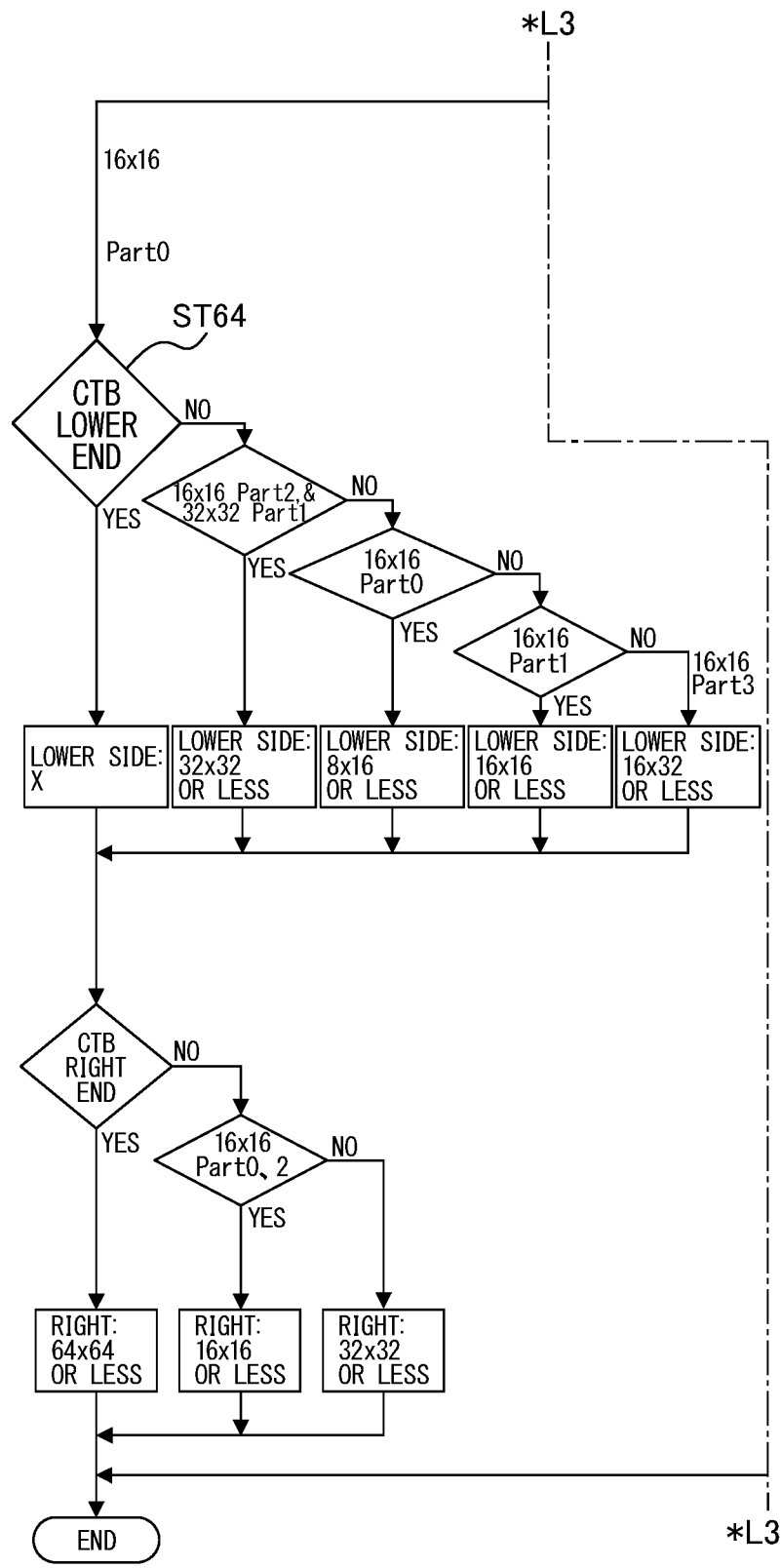
FIG. 23A, FIG. 23B and FIG. 23C are a flowchart for explaining an example of allocation processing of the cores according to the second embodiment (part 3)
Figure 23B:
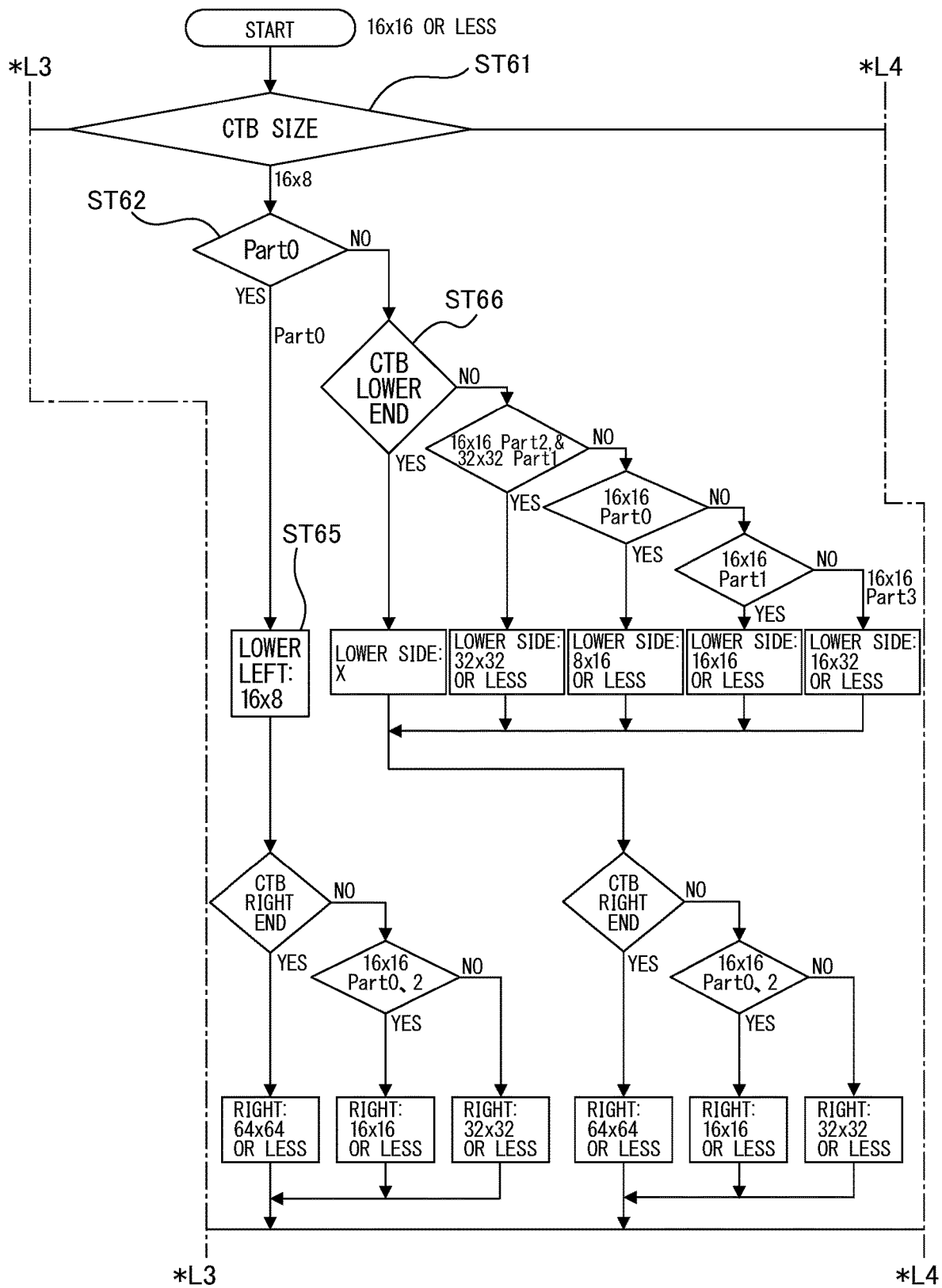
Figure 23C:
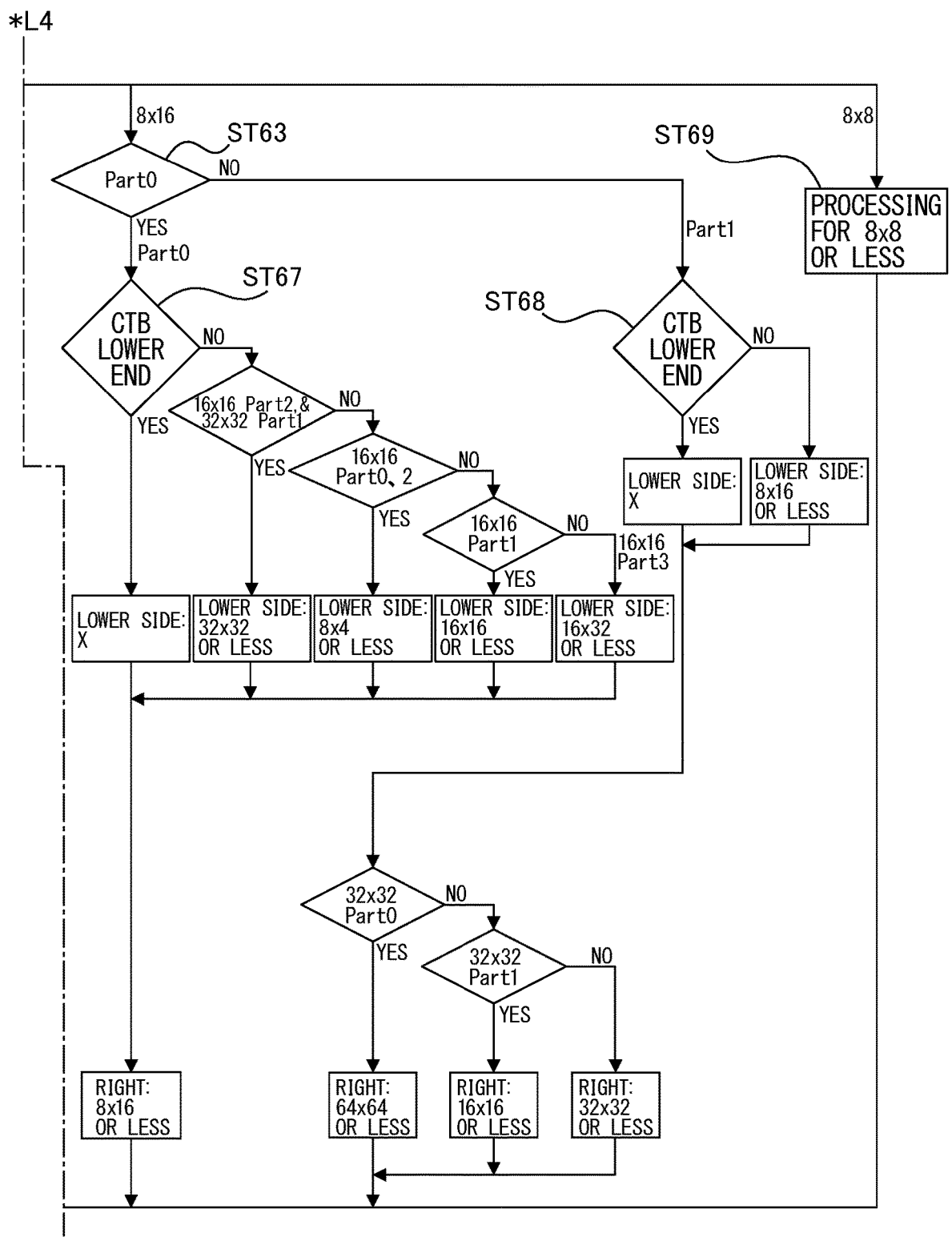
Figure 24:
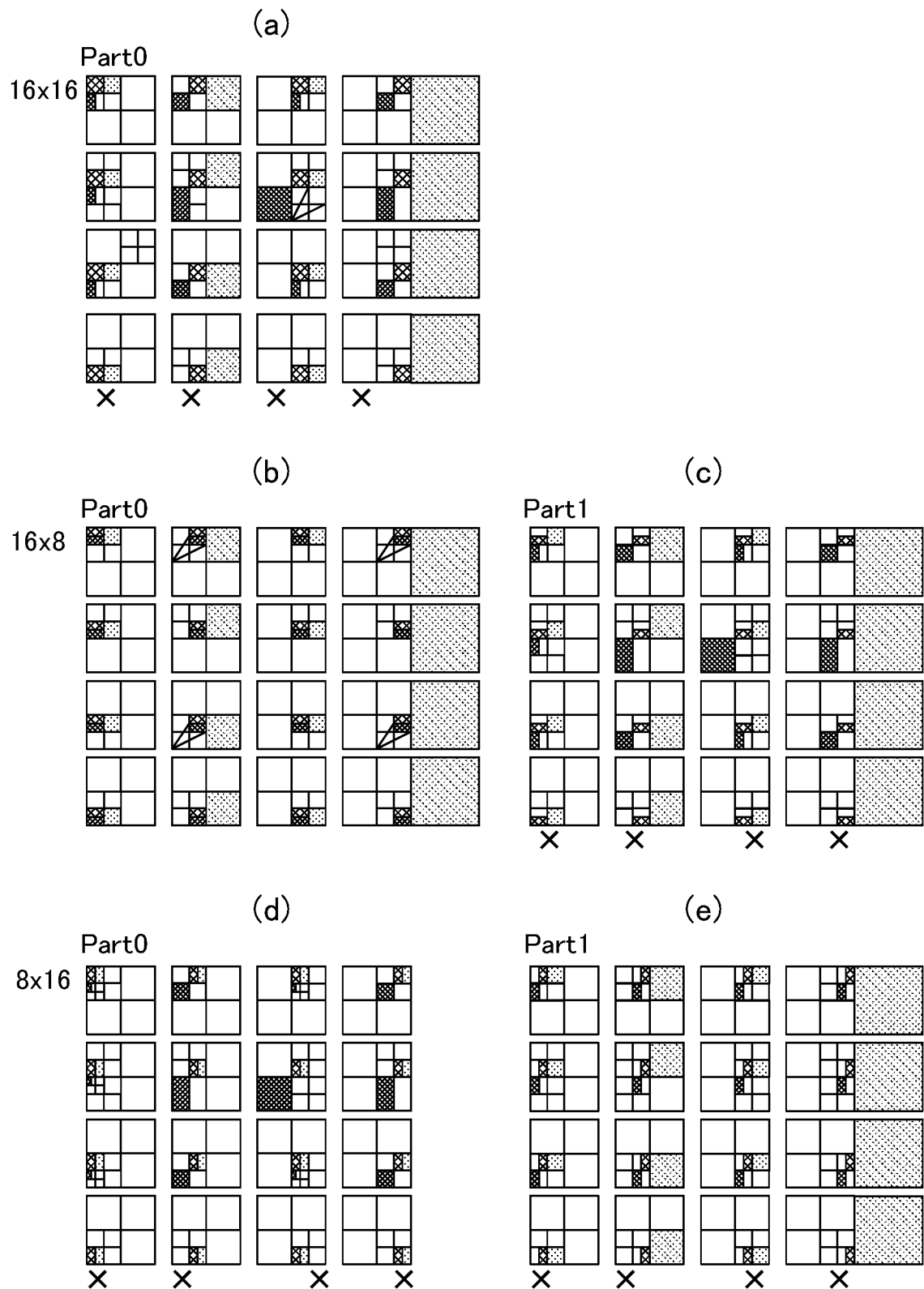
FIG. 24 is a drawing for explaining processing according to a flowchart illustrated in FIG. 23A, FIG. 23B and FIG. 23C.

FIG. 19, FIG. 21A, FIG. 21B, FIG. 23A, FIG. 23B, and FIG. 23C are flowcharts for explaining an example of allocation processing of the cores according to the second embodiment. FIG. 20, FIG. 22 and FIG. 24 are drawings for explaining processing according to flowcharts illustrated in FIG. 19, FIG. 21A, FIG. 21B, FIG. 23A, FIG. 23B, and FIG. 23C, respectively.

Figure 19:
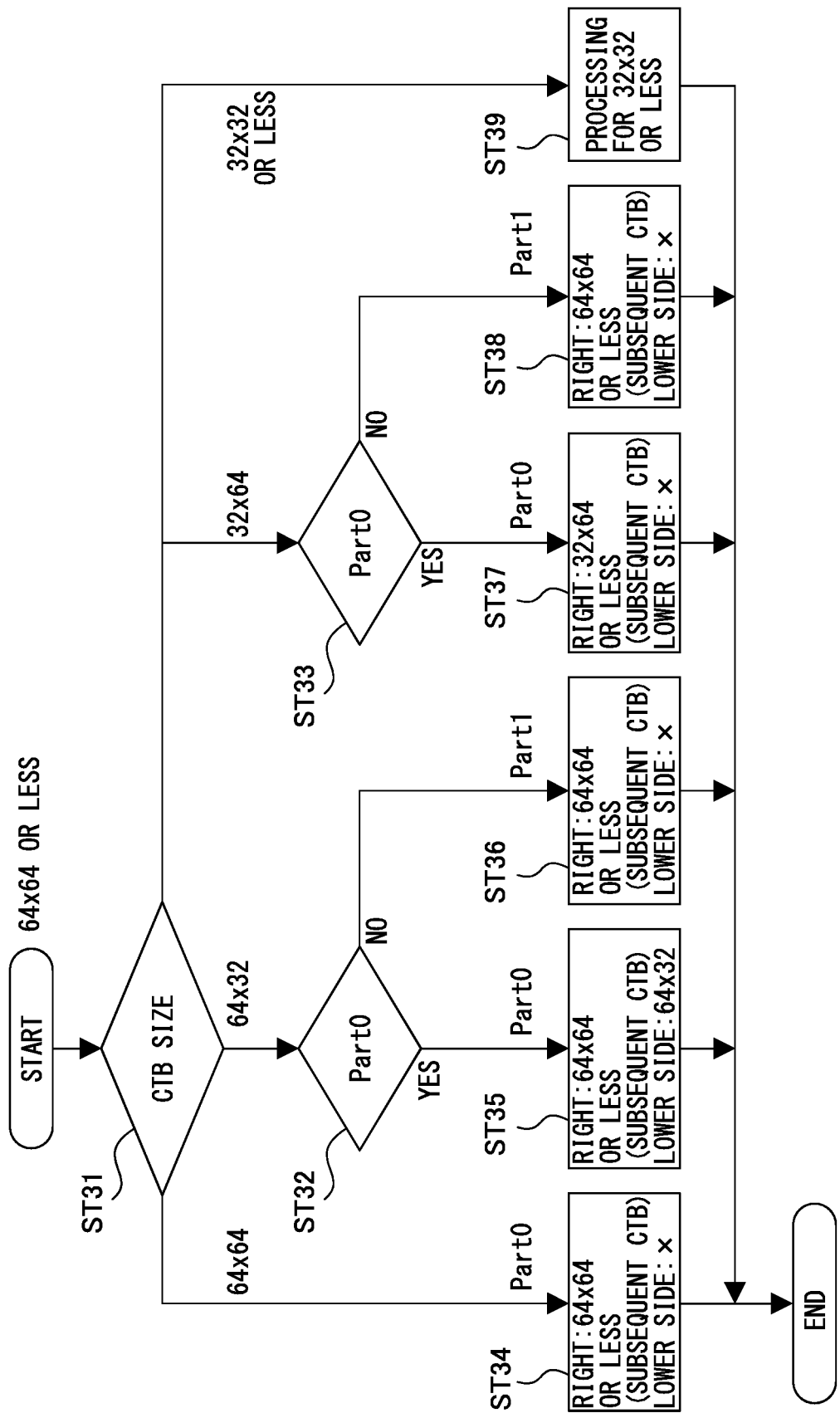
FIG. 19 is a flowchart for explaining an example of allocation processing of the cores according to the second embodiment (part 1)

More specifically, FIG. 19 illustrates processing for 64×64 (pixels: CTB) or less. FIG. 21A and FIG. 21B illustrate processing for 32×32 or less in step ST39 in FIG. 19. FIG. 23A, FIG. 23B and FIG. 23C illustrate processing for 16×16 or less in step ST51 in FIG. 21B.

As illustrated in FIG. 19, when allocation processing (64×64 or less) of the cores according to the second embodiment is started, the size of the CTB (Coding Tree Block: the present block) is determined in step ST31.

When the size of the present block is determined to be 64×64 in step ST31, step ST34 is subsequently executed, and when the size of the present block is determined to be 64×32, step ST32 is subsequently executed, and when the size of the present block is determined to be 32×64, step ST33 is subsequently executed. When the size of the present block is determined to be 32×32 or less in step ST31, step ST39 is subsequently executed.

In step ST34, as illustrated in FIG. 20(a), the block to be processed subsequently to the currently processed block (the present CTB) Bp11 is only the right side block (subsequent CTB) Bp12, and the lower block is not processed at a time (X).

In step ST32, a determination is made as to whether the size of the present block is Part 0 (PU=0) or not. When the size of the present block (64×32) is determined to be Part 0 (YES), step ST35 is subsequently executed. When the size of the present block is determined not to be Part 0 (NO), step ST36 is subsequently executed.

In step ST33, a determination is also made as to whether the size of the present block is Part 0 or not. When the size of the present block (32×64) is determined to be Part 0 (YES), step ST37 is subsequently executed. When the size of the present block is determined not to be Part 0 (NO), step ST38 is subsequently executed.

In step ST35, as illustrated in FIG. 20(b), the block which is to be processed subsequently to Bp21 (the present CTB) may be not only the right side block (subsequent CTB) Bp23 but also the lower lock Bp22, so that both of Bp22 and Bp23 can be processed at a time. More specifically, for example, while the first core CR1 processes the block Bp23, the second core CR2 can process the block Bp22 in parallel.

In step ST36 to ST38, as illustrated in FIG. 20(c) to FIG. 20(e), like step ST34, the blocks Bp25, Bp32, Bp34 at the right side of the currently processed blocks Bp24, Bp31, Bp33 are processed, and the lower block is not processed at a time (X).

As illustrated in FIG. 21A and FIG. 21B, when the processing of the processing (32×32 or less) in step ST39 in FIG. 19 is started, the size of the present block (CTB) is determined in step ST41.

When the size of the present block is determined to be 32×32 in step ST41, step ST44 is subsequently executed. When the size of the present block is determined to be 32×16, step ST42 is subsequently executed. When the size of the present block is determined to be 16×32, step ST43 is subsequently executed. When the size of the present block is determined to be 16×16 or less in step ST41, step ST51 is subsequently executed.

In step ST44, a determination is made as to whether the size of the present block is Part 0 (PU=0) or not. In step ST45, a determination is made as to whether the size of the present block is Part 1 (PU=1) or not. In step ST46, a determination is made as to whether the size of the present block is Part 2 (PU=2) or not.

Then, when the size of the present block is determined to be Part 0, step ST47 is subsequently executed. When the size of the present block is determined to be Part 1, step ST48 is subsequently executed. When the size of the present block is determined to be Part 2, step ST49 is subsequently executed. When the size of the present block is determined not to be Part 0 to Part 2, step ST50 is subsequently executed.

As illustrated in FIG. 22(a), when the size of the present block is other than Part 2 and Part 0 to Part 2, only the right side block can be processed, and the lower block is not processed in parallel (X). However, it is understood that, when the size of the present block is Part 0 and Part 1, not only the right side block but also the lower side block can be processed in parallel.

FIG. 22(b) corresponds to each processing in a case where the size of the present block is determined to be Part 0 in step ST42 (YES). FIG. 22(c) corresponds to each processing in a case where the size of the present block is determined not to be Part 0 in step ST42 (NO).

Further, FIG. 22(d) corresponds to each processing in a case where the size of the present block is determined to be Part 0 in step ST43 (YES). FIG. 22(e) corresponds to each processing in a case where the size of the present block is determined not to be Part 0 in step ST43 (NO).

More specifically, it is understood that, in FIG. 22(b), parallel processing can be performed in all of the cases, and in FIG. 22(c) to FIG. 22(e), parallel processing is impossible (X) in two cases, and parallel processing is possible in two cases.

As illustrated in FIG. 23A, FIG. 23B and FIG. 23C, when the processing of the processing (16×16 or less) in step ST51 in FIG. 21B is started, the size of the present block (CTB) is determined in step ST61.

When the size of the present block is determined to be 16×16 in step ST61, step ST64 is subsequently executed. When the size of the present block is determined to be 16×8, step ST62 is subsequently executed. When the size of the present block is determined to be 8×16, step ST63 is subsequently executed. When the size of the present block is determined to be 8×8 or less in step ST61, step ST69 is subsequently executed.

When the size of the present block is determined to be Part 0 (YES) in step ST62, step ST65 is subsequently executed. When the size of the present block is determined not to be Part 0 (NO), step ST66 is subsequently executed. When the size of the present block is determined to be Part 0 (YES) in step ST63, step ST67 is subsequently executed. When the size of the present block is determined not to be Part 0 (NO), step ST68 is subsequently executed.

FIG. 24(a) corresponds to the processing of step ST64 and later. FIG. 24(b) corresponds to the processing of step ST65 and later. FIG. 24(c) corresponds to the processing of step ST66 and later. FIG. 24(d) corresponds to the processing of step ST67 and later. FIG. 24(e) corresponds to the processing of step ST68 and later.

As illustrated in FIG. 24(a) and FIG. 24(c) to FIG. 24(e), it is understood that the processing in step ST64 and ST66 to ST68, the parallel processing of the right side block and the lower block can be performed except four cases at the bottom of each drawing.

Further, as illustrated in FIG. 24(b), it is understood that, in the processing of step ST65 and later, the parallel processing of the right side block and the lower block can be performed in all of the cases. The processing in which the size of the present block is 8×8 or less in step ST69 is, for example, 4×8 and 8×4 in HEVC, but the explanation thereabout is omitted.

As described above, according to this second embodiment, for example, when there exists a core stopped and kept waiting in the processing, the processing time can be reduced by performing parallel processing with multiple cores by using the stopped core. It will be noted that the number of cores used for the parallel processing is not limited to one. When there are multiple stopped cores, it is to be understood that multiple cores can be used.

Figure 25A:
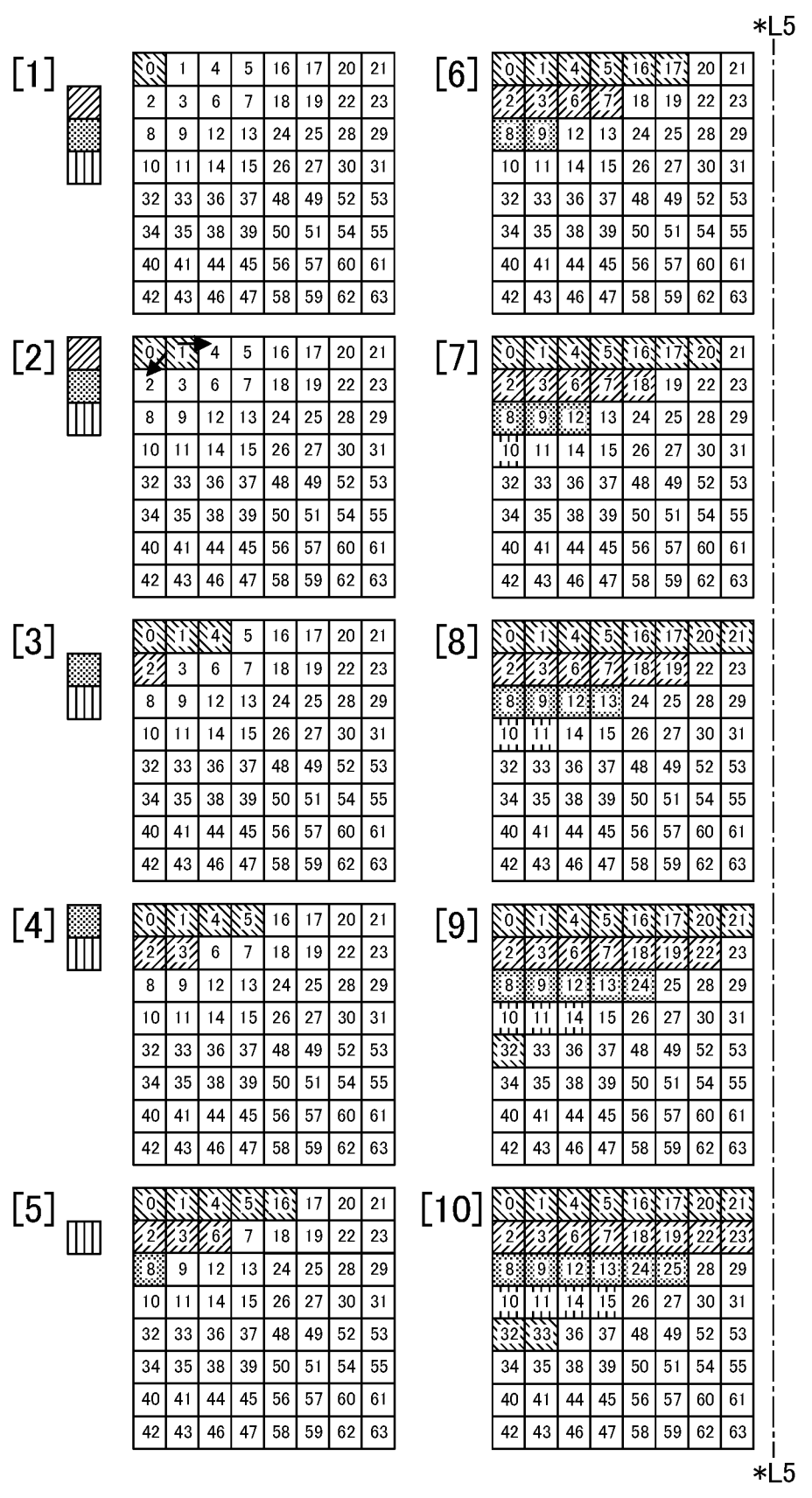
Figure 25B:
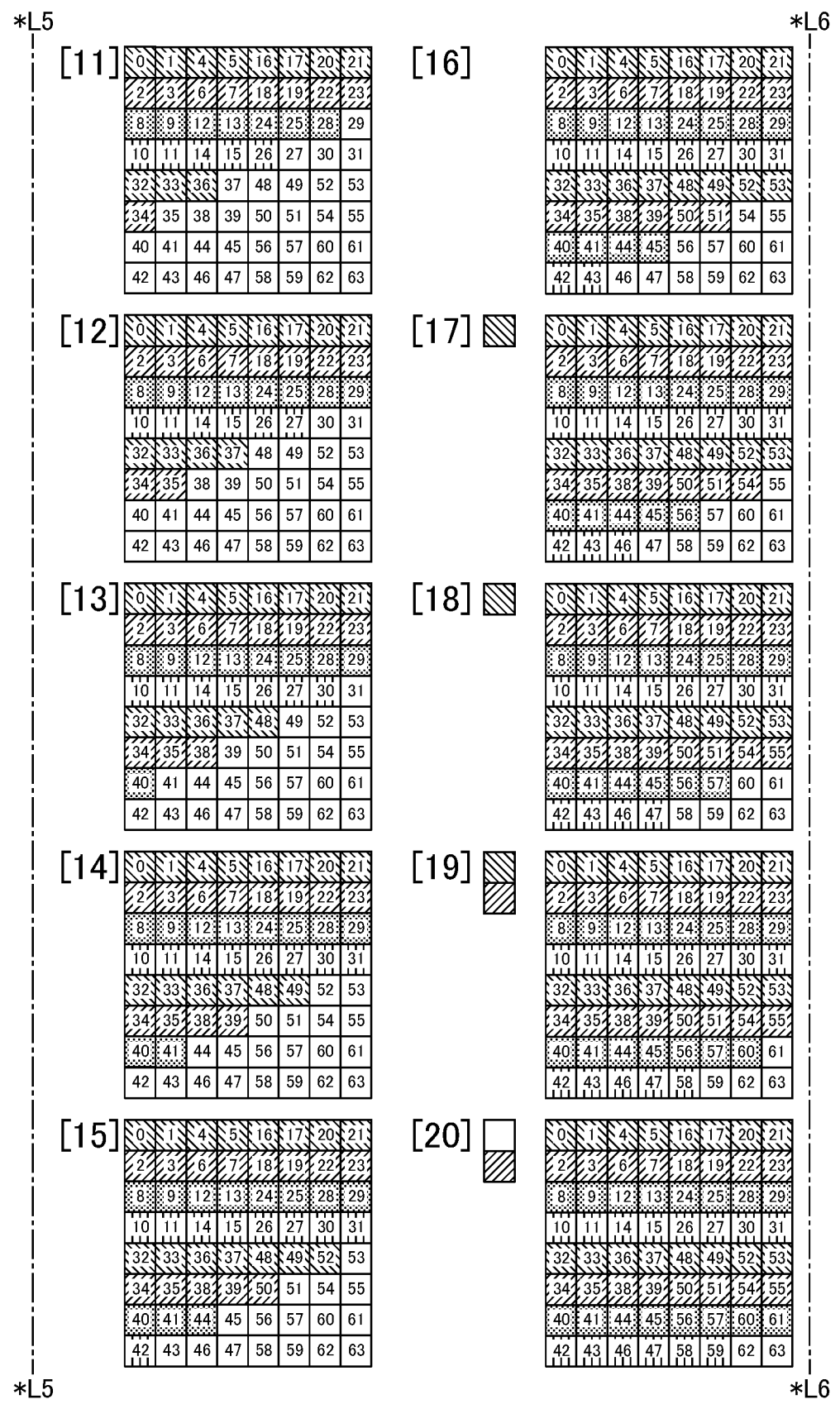
Figure 25C:
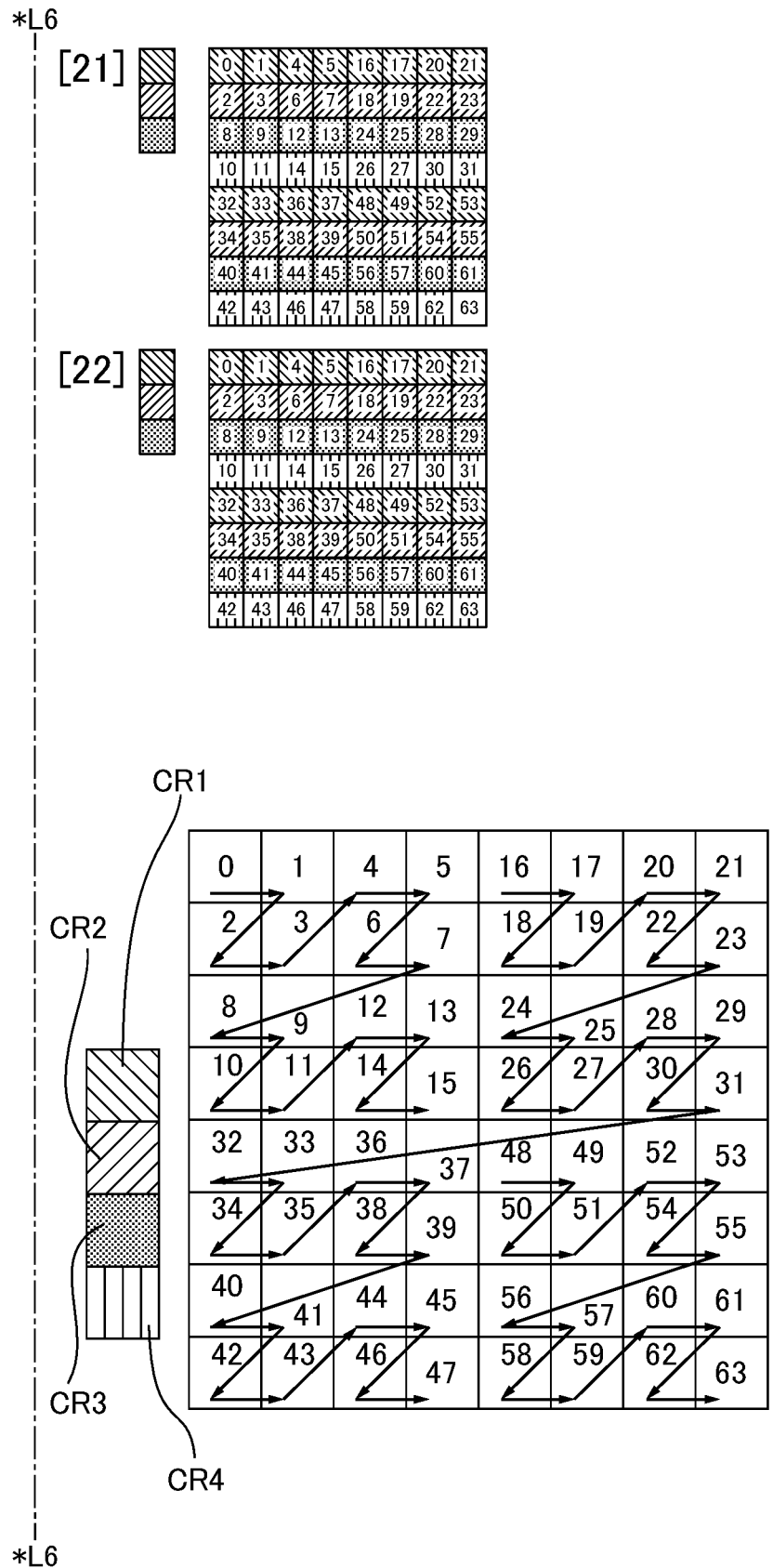

FIG. 25A, FIG. 25B and FIG. 25C are drawings for explaining parallel processing with four cores. In FIG. 25A, FIG. 25B and FIG. 25C, for example, performing parallel processing by using a core stopped and kept waiting in the processing like the second embodiment explained above is not taken into consideration.

FIG. 25A, FIG. 25B and FIG. 25C illustrate an example in which the size of the CTB is 64×64, and the sizes of all the blocks are 8×8. In the first order of the processing, the processing is started with only a single core, i.e., the first core CR1. Thereafter, the second order of the processing for a subsequent cycle is performed.

In the state of the processing position "1", the parallel operation can be performed, and the first core CR1 performs processing from the processing positions "1" to "4", and in the second order of the processing, the second core CR2 performs the processing of the processing position "2". Such processing is repeatedly performed from the processing positions "0" to "63".

As illustrated in FIG. 25A, FIG. 25B and FIG. 25C, it is understood that, by performing such processing, for example, the processing of 64 cycles from "0" to "63" is finished in 22 cycles by using the four cores CR1 to CR4.

In the cycles [6] to [16], all of the four cores CR1 to CR4 perform the parallel operation, and in the cycles [5], [17], and [18], three cores (CR1 to CR3 or CR2 to CR4) perform the parallel operation. In the cycles [3], [4], [19], and [20], two cores (CR1, CR2 or CR3, CR4) perform the parallel operation. In the cycles [1], [2], [21], and [22], one core (CR1 or CR4) performs the parallel operation.

Figure 26:
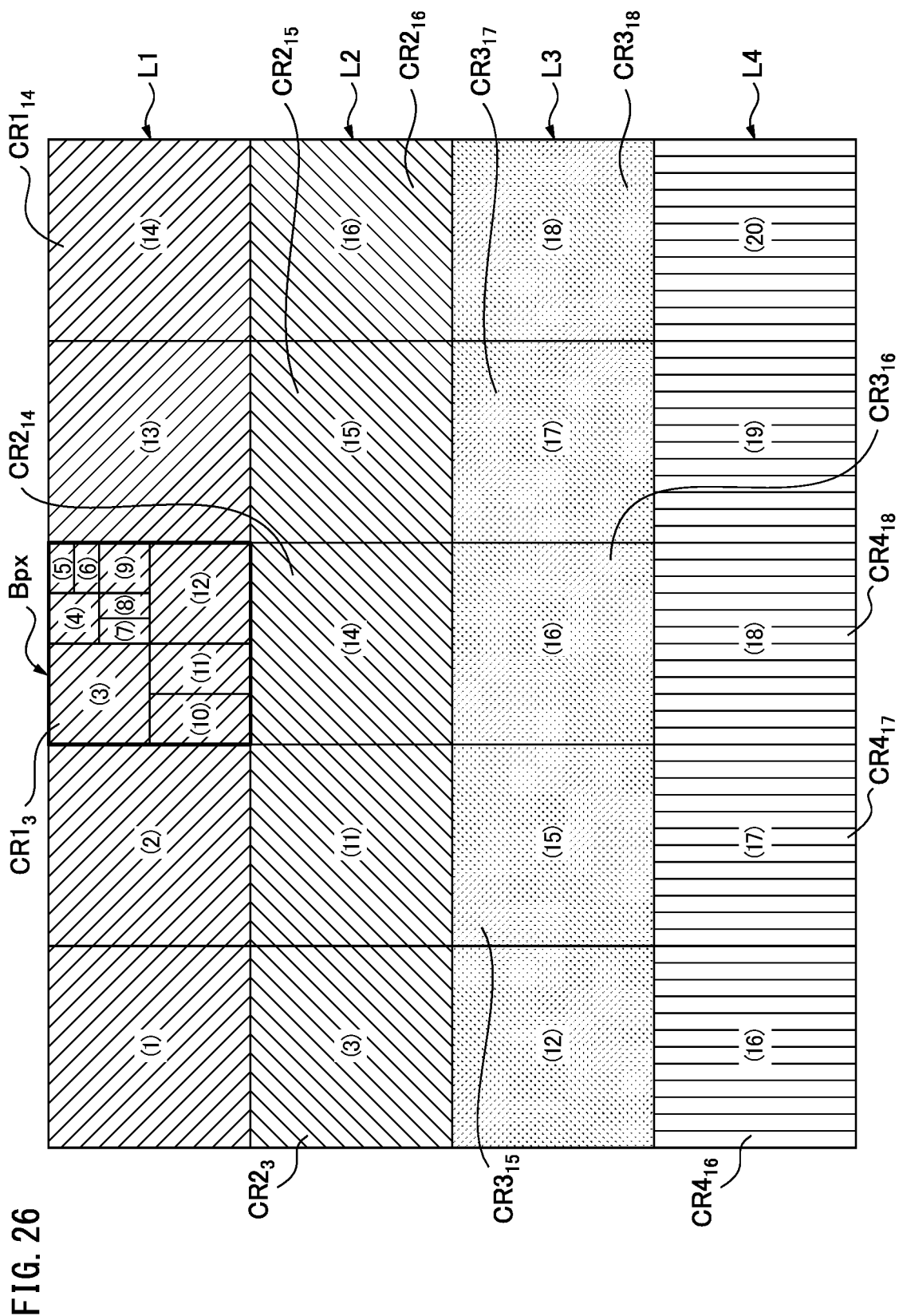
FIG. 26 is a drawing for explaining effects of allocation processing of cores according to the second embodiment (part 1)
Figure 27:
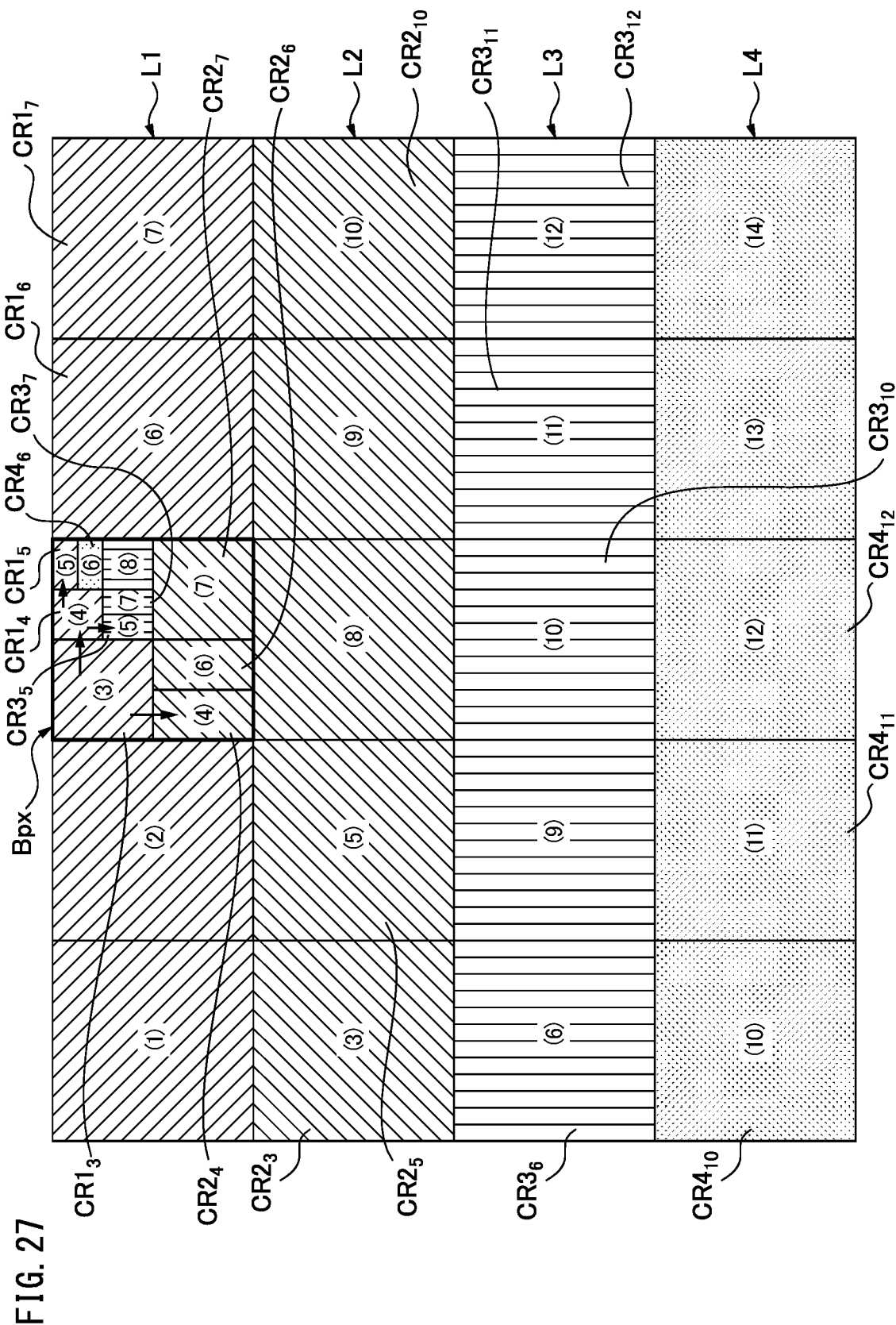
FIG. 27 is a drawing for explaining effects of allocation processing of cores according to the second embodiment (part 2).

FIG. 26 and FIG. 27 are drawings for explaining the effect of allocation processing of the cores according to the second embodiment. FIG. 26 illustrates an example of operation in a case where the second embodiment is not applied. FIG. 27 illustrates an example of operation in a case where the second embodiment is applied.

In FIG. 26 and FIG. 27, the first core CR1 to the fourth core CR4 are basically allocated to the CTB lines L1 to L4, respectively. Further in FIG. 27, the parallel processing using the stopped core according to the second embodiment explained above is performed.

As is evident from the comparison between FIG. 26 and FIG. 27, the processing, which needed 20 cycles when the second embodiment is not applied, can be reduced to 14 cycles by applying the second embodiment.

More specifically, as illustrated in FIG. 26, when the second embodiment is not applied, multiple cores capable of operating at a time (in parallel) are, for example, only the following cores, $CR1_3$, $CR2_3$, $CR1_{14}$, $CR2_{14}$, $CR2_{15}$, $CR3_{15}$, $CR2_{16}$, $CR3_{16}$, $CR4_{16}$, and the like.

For example, reference symbol $CR2_{16}$ denotes block processing that is performed by the second core CR2 in the 16-th cycle. Reference symbol $CR3_{16}$ illustrates block processing that is performed by the third core CR3 in the 16-th cycle. Reference symbol $CR4_{16}$ illustrates block processing that is performed by the fourth core CR4 in the 16-th cycle.

For example, when, in the CTB line L1, the divided CTB block Bpx is processed, and the second embodiment is not applied, the processing is performed with only the first core CR1. Therefore, the cores CR2 to CR4 processing L2 to L4 include the cycles stopped and kept waiting. As a result, it takes 20 cycles to finish all the processing.

In contrast, as illustrated in FIG. 27, when the second embodiment is applied, multiple cores capable of performing the parallel operation are not only, for example, $CR1_3$, $CR2_3$, and $CR2_{10}$, $CR3_{10}$, $CR4_{10}$, and the like, and further, still more parallel processing can be performed.

More specifically, when the second embodiment is applied, for example, the processing of the CTB block Bpx can be performed with multiple cores such as $CR1_5$, $CR3_5$, $CR2_6$, $CR3_6$, and further, the processing of another CTB line (CTB) can also be performed with $CR2_5$, $CR1_6$ in parallel.

As a result, the processing time to finish all of the processing can be reduced from 20 cycles to 14 cycles. This is expected to be able to further reduce the processing time in accordance with used cores and the size into which the CTB block is divided.

The first embodiment and the second embodiment explained above is not limited to be applied to HEVC (H.265), and can be applied to various image processing techniques for processing images by using multiple cores (processor cores).

The present embodiment can be applied to the decoding device 3 explained with reference to FIG. 1 or FIG. 16, but can also be embodied as, for example, a program that is executed by the arithmetic processing device (CPU) 300 of the decoding device 3 as illustrated in FIG. 16.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations can be made hereto without departing from the spirit and scope of the invention.

What is claimed is:

1. An image processing apparatus comprising:
a plurality of cores configured to be allocated to a plurality of tiles obtained by dividing a single image data and to process the plurality of tiles by using an adjacent memory having a memory capacity, each of the plurality of tiles including a plurality of blocks, each of the plurality of blocks including at least one unit; and
an arithmetic processing device configured to control allocation of the plurality of cores based on the divided tiles, wherein
the arithmetic processing device allocates all of the plurality of cores to a single line of the plurality of tiles in a second direction, when the single image data is divided into the plurality of tiles in a first direction and the second direction perpendicular to the first direction, wherein
when a number of tiles in the second direction is less than a number of cores, the arithmetic processing device, in the second direction, allocates a first number of cores to a tile having a first size, and allocates a second number of cores to a tile having a second size, the second number being more than the first number, and the second size being larger than the first size,
wherein the adjacent memory is configured to store processed contents corresponding to the single line of the plurality of tiles in the second direction,
wherein the first direction is a direction perpendicular to the second direction and a direction in which the memory capacity to be required for processing the tiles increases when at least two tiles in the first direction are processed at a same time,
wherein the plurality of cores are configured to process the plurality of blocks in the second direction in sequence in the corresponding allocated tiles, respectively, and only one block is processed at a same time in a same position when viewed from the first direction,
wherein the at least one unit is processed in sequence from an upper side to a lower side in each of the plurality of blocks, and
wherein, when a first unit which is not adjacent to the lower side in the block is processed, a third unit which is adjacent to the first unit in the first direction and a fourth unit which is adjacent to the first unit in the second direction are processed at a same time subsequently, and when a second unit which is adjacent to the lower side in the block is processed, a fifth unit which is adjacent to the second unit in the second direction is processed subsequently and a sixth unit which is adjacent to the second unit in the first direction is not processed at a same time as the fifth unit.

2. The image processing apparatus according to claim 1, wherein the arithmetic processing device is configured not to allocate the cores to a tile adjacent in the first direction to the single line of the plurality of tiles to which the plurality of cores are allocated.

3. The image processing apparatus according to claim 1, wherein the first direction is a vertical direction of the single image data, and
the second direction is a horizontal direction of the single image data.

4. The image processing apparatus according to claim 1, wherein when an operation of a second core which processes a second image block line subsequent to a first image block line stops because processing of the first image block line performed earlier by a first core is not finished, the arithmetic processing device allocates not only the first core but also the second core to processing of the first image block line.

5. The image processing apparatus according to claim 4, wherein when an operation of a third core which processes a third image block line subsequent to the second image block line stops because processing of the first image block line performed earlier by the first core is not finished, the arithmetic processing device allocates not only the first core and the second core but also the third core to processing of the first image block line.

6. The image processing apparatus according to claim 1, wherein the image processing apparatus is a decoding device configured to decode an image by performing inter-prediction based on the single image data.

7. The image processing apparatus according to claim 1, wherein when at least two of the plurality of cores are allocated to a single tile in the single line of the plurality of tiles, the arithmetic processing device controls allocation of the at least two of the plurality of cores to a plurality of image block lines obtained by dividing the single tile to which the at least two of the plurality of cores are allocated, and when an operation of a second core which processes a second image block line subsequent to a first image block line stops because processing of the first image block line performed earlier by a first core is not finished, the arithmetic processing device allocates not only the first core but also the second core to processing of the first image block line.

8. An image processing method that performs image processing, comprising:
dividing a single image data into a plurality of tiles;
allocating a plurality of cores to the divided tiles; and
processing, by the plurality of cores, the plurality of tiles by using an adjacent memory having a memory capacity, each of the plurality of tiles including a plurality of blocks, each of the plurality of blocks including at least one unit,
wherein all of the plurality of cores are allocated to a single line of the plurality of tiles in a second direction, when the single image data is divided into the plurality of tiles in a first direction and the second direction perpendicular to the first direction,
wherein when a number of tiles in the second direction is less than a number of cores, an arithmetic processing device, in the second direction, allocates a first number of cores to a tile having a first size, and allocates a second number of cores to a tile having a second size, the second number being more than the first number, and the second size being larger than the first size,
wherein the adjacent memory is configured to store processed contents corresponding to the single line of the plurality of tiles in the second direction,
wherein the first direction is a direction perpendicular to the second direction and a direction in which the memory capacity to be required for processing the tiles increases when at least two tiles in the first direction are processed at a same time,
wherein the plurality of cores are configured to process the plurality of blocks in the second direction in sequence in the corresponding allocated tiles, respectively, and only one block is processed at a same time in a same position when viewed from the first direction,
wherein the at least one unit is processed in sequence from an upper side to a lower side in each of the plurality of blocks, and wherein, when a first unit which is not adjacent to the lower side in the block is processed, a third unit which is adjacent to the first unit in the first direction and a fourth unit which is adjacent to the first unit in the second direction are processed at a same time subsequently, and when a second unit which is adjacent to the lower side in the block is processed, a fifth unit which is adjacent to the second unit in the second direction is processed subsequently and a sixth unit which is adjacent to the second unit in the first direction is not processed at a same time as the fifth unit.

9. The image processing method according to claim 8, wherein the core is not allocated to a tile in the first direction adjacent to the single line of the plurality of tiles to which the plurality of cores are allocated.

10. The image processing method according to claim 8, wherein when an operation of a second core which processes a second image block line subsequent to a first image block line stops because processing of the first image block line performed earlier by a first core is not finished, not only the first core but also the second core are allocated to processing of the first image block line.

11. The image processing method according to claim 8, wherein when at least two of the plurality of cores are allocated to a single tile in the single line of the plurality of tiles, allocation of the at least two of the plurality of cores to a plurality of image block lines obtained by dividing the single tile to which the at least two of the plurality of cores are allocated is controlled, and when an operation of a second core which processes a second image block line subsequent to a first image block line stops because processing of the first image block line performed earlier by a first core is not finished, not only the first core but also the second core are allocated to processing in the first image block line.

12. An image processing apparatus comprising:
a plurality of cores configured to be allocated to a plurality of tiles obtained by dividing a single image data and to process the plurality of tiles by using an adjacent memory having a memory capacity, each of the plurality of tiles including a plurality of blocks, each of the plurality of blocks including at least one unit; and
an arithmetic processing device configured to control allocation of the plurality of cores based on the divided tiles, wherein
the arithmetic processing device allocates all of the plurality of cores to a single line of the plurality of tiles in a second direction, when the single image data is divided into the plurality of tiles in a first direction and the second direction perpendicular to the first direction, wherein
when a number of tiles in the second direction is less than a number of cores, the arithmetic processing device, in the second direction, allocates a third number of cores to a tile in which a number of divisions of the blocks included therein is a first number, and allocates a fourth number of cores to a tile in which the number of divisions of the blocks included therein is a second number, the fourth number being more than the third number, and the second number being more than the first number,
wherein the adjacent memory is configured to store processed contents corresponding to the single line of the plurality of tiles in the second direction,
wherein the first direction is a direction perpendicular to the second direction and a direction in which the memory capacity to be required for processing the tiles increases when at least two tiles in the first direction are processed at a same time, wherein the plurality of cores are configured to process the plurality of blocks in the second direction in sequence in the corresponding allocated tiles, respectively, and only one block is processed at a same time in a same position when viewed from the first direction, wherein the at least one unit is processed in sequence from an upper side to a lower side in each of the plurality of blocks, and wherein, when a first unit which is not adjacent to the lower side in the block is processed, a third unit which is adjacent to the first unit in the first direction and a fourth unit which is adjacent to the first unit in the second direction are processed at a same time subsequently, and when a second unit which is adjacent to the lower side in the block is processed, a fifth unit which is adjacent to the second unit in the second direction is processed subsequently and a sixth unit which is adjacent to the second unit in the first direction is not processed at a same time as the fifth unit.

13. The image processing apparatus according to claim 12, wherein the arithmetic processing device is configured not to allocate the cores to a tile adjacent in the first direction to the single line of the plurality of tiles to which the plurality of cores are allocated.

14. The image processing apparatus according to claim 12, wherein the first direction is a vertical direction of the single image data, and the second direction is a horizontal direction of the single image data.

15. The image processing apparatus according to claim 12, wherein when an operation of a second core which processes a second image block line subsequent to a first image block line stops because processing of the first image block line performed earlier by a first core is not finished, the arithmetic processing device allocates not only the first core but also the second core to processing of the first image block line.

16. The image processing apparatus according to claim 15, wherein when an operation of a third core which processes a third image block line subsequent to the second image block line stops because processing of the first image block line performed earlier by the first core is not finished, the arithmetic processing device allocates not only the first core and the second core but also the third core to processing of the first image block line.

17. The image processing apparatus according to claim 12, wherein when at least two of the plurality of cores are allocated to a single tile in the single line of the plurality of tiles, the arithmetic processing device controls allocation of the at least two of the plurality of cores to a plurality of image block lines obtained by dividing the single tile to which the at least two of the plurality of cores are allocated, and when an operation of a second core which processes a second image block line subsequent to a first image block line stops because processing of the first image block line performed earlier by a first core is not finished, the arithmetic processing device allocates not only the first core but also the second core to processing of the first image block line.

18. The image processing apparatus according to claim 17, wherein the image processing apparatus is a decoding device configured to decode an image by performing inter-prediction based on the single image data.

19. An image processing method that performs image processing, comprising:

dividing a single image data into a plurality of tiles;

allocating a plurality of cores to the divided tiles; and processing, by the plurality of cores, the plurality of tiles by using an adjacent memory having a memory capacity, each of the plurality of tiles including a plurality of blocks, each of the plurality of blocks including at least one unit, wherein all of the plurality of cores are allocated to a single line of the plurality of tiles in a second direction, when the single image data is divided into the plurality of tiles in a first direction and the second direction perpendicular to the first direction, wherein when a number of tiles in the second direction is less than the number of cores, an arithmetic processing device, in the second direction, allocates a third number of cores to a tile in which a number of divisions of the blocks included therein is a first number, and allocates a fourth number of cores to a tile in which the number of divisions of the blocks included therein is a second number, the fourth number being more than the third number, and the second number being more than the first number, wherein the adjacent memory is configured to store processed contents corresponding to the single line of the plurality of tiles in the second direction, wherein the first direction is a direction perpendicular to the second direction and a direction in which the memory capacity to be required for processing the tiles increases when at least two tiles in the first direction are processed at a same time, wherein the plurality of cores are configured to process the plurality of blocks in the second direction in sequence in the corresponding allocated tiles, respectively, and only one block is processed at a same time in a same position when viewed from the first direction, wherein the at least one unit is processed in sequence from an upper side to a lower side in each of the plurality of blocks, and wherein, when a first unit which is not adjacent to the lower side in the block is processed, a third unit which is adjacent to the first unit in the first direction and a fourth unit which is adjacent to the first unit in the second direction are processed at a same time subsequently, and when a second unit which is adjacent to the lower side in the block is processed, a fifth unit which is adjacent to the second unit in the second direction is processed subsequently and a sixth unit which is adjacent to the second unit in the first direction is not processed at a same time as the fifth unit.

20. The image processing method according to claim 19, wherein the core is not allocated to a tile in the first direction adjacent to the single line of the plurality of tiles to which the plurality of cores are allocated.

21. The image processing method according to claim 19, wherein when an operation of a second core which processes a second image block line subsequent to a first image block line stops because processing of the first image block line performed earlier by a first core is not finished, not only the first core but also the second core are allocated to processing of the first image block line.

22. The image processing method according to claim 19, wherein when at least two of the plurality of cores are allocated to a single tile in the single line of the plurality of tiles, allocation of the at least two of the plurality of cores to a plurality of image block lines obtained by dividing the single tile to which the at least two of the plurality of cores are allocated is controlled, and when an operation of a second core which processes a second image block line subsequent to a first image block line stops because processing of the first image block line performed earlier by a first core is not finished, not only the first core but also the second core are allocated to processing in the first image block line.

* * * * *